United States Patent
Kawai et al.

(10) Patent No.: US 12,294,313 B2
(45) Date of Patent: May 6, 2025

(54) DRIVE SYSTEM AND CONTROL DEVICE FOR DRIVE SYSTEM

(71) Applicant: TOSHIBA MITSUBISHI-ELECTRIC INDUSTRIAL SYSTEMS CORPORATION, Chuo-ku (JP)

(72) Inventors: Shinya Kawai, Tokyo (JP); Kenshi Takao, Tokyo (JP); Shunsuke Tobayashi, Tokyo (JP); Chikara Morito, Tokyo (JP); Haruyuki Yamaguchi, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 97 days.

(21) Appl. No.: 18/042,940

(22) PCT Filed: Feb. 8, 2021

(86) PCT No.: PCT/JP2021/004577
§ 371 (c)(1),
(2) Date: Feb. 24, 2023

(87) PCT Pub. No.: WO2022/168310
PCT Pub. Date: Aug. 11, 2022

(65) Prior Publication Data
US 2024/0195321 A1    Jun. 13, 2024

(51) Int. Cl.
*H02M 7/483* (2007.01)
*H02M 7/49* (2007.01)
*H02P 27/14* (2006.01)

(52) U.S. Cl.
CPC .............. *H02M 7/49* (2013.01); *H02P 27/14* (2013.01)

(58) Field of Classification Search
CPC ......... H02M 7/49; H02M 7/483; H02P 27/14; H02P 27/08
See application file for complete search history.

(56) References Cited

U.S. PATENT DOCUMENTS

| | | | |
|---|---|---|---|
| 11,342,878 B1* | 5/2022 | Abuelnaga | H02M 7/49 |
| 2007/0147098 A1* | 6/2007 | Mori | H02J 3/1857 363/71 |
| 2020/0287494 A1* | 9/2020 | Ishizuka | H02P 27/08 |

FOREIGN PATENT DOCUMENTS

| | | |
|---|---|---|
| JP | 5952623 B2 | 7/2016 |
| JP | 2019-201493 A | 11/2019 |

OTHER PUBLICATIONS

Rohit Kumar "Assessment of Multi-Phase Conversion and Modified PWM Strategy for Power Converters of Medium-Voltage Induction Motors Drive", May 2023 (Year: 2023).*

(Continued)

*Primary Examiner* — Sisay G Tiku
(74) *Attorney, Agent, or Firm* — Oblon, McClelland, Maier & Neustadt, L.L.P.

(57) ABSTRACT

A drive system (1) drives a multi-phase AC motor (2) having a plurality of windings. The drive system (1) includes a first power converter (3U), a second power converter (3V), a first conversion controller (20U), and a second conversion controller (20V). The first power converter (3U) causes a current to flow through a winding of a first phase of the multi-phase AC motor (2). The second power converter (3V) causes a current to flow through a winding of a second phase of the multi-phase AC motor (2). The first conversion controller (20U) decides on either a three-level phase voltage waveform or a five-level phase voltage waveform on the basis of setting information for designating a type of phase voltage waveform and controls the first power converter (3U) so that the decided phase voltage waveform is output from the first power converter (3U). The second conversion controller (20V) controls the second power converter (3V) so that a phase voltage waveform having the same type as the phase voltage waveform of the first power converter (Continued)

(3U) is output from the second power converter (3V) on the basis of the setting information for designating the type of phase voltage waveform.

13 Claims, 11 Drawing Sheets

(56) References Cited

OTHER PUBLICATIONS

Rohit Kumar "Implementation and Operation of Hybrid Multilevel and Multipulse Power Converter for High-Performance of Induction Motor Drives", Nov. 28, 2023 (Year: 2023).*
Rohit Kumar "Influence Investigation of Multiphase Multipulse Converter and Floating Voltage Source Inverter-Based Motor Drive System" , Dec. 11, 2023 (Year: 2023).*
International Search Report issued Apr. 6, 2021 in PCT/JP2021/004577, filed on Feb. 8, 2021, 4 pages (with English Translation).

\* cited by examiner

DRIVE SYSTEM AND CONTROL DEVICE FOR DRIVE SYSTEM

TECHNICAL FIELD

Embodiments of the present invention relate to a drive system and a control device for the drive system.

BACKGROUND ART

A drive system drives an alternating current (AC) motor by supplying multi-phase AC power to an AC motor (a multi-phase AC motor). Types of drive systems are classified on the basis of characteristics of an AC voltage waveform applied by a power conversion device to a winding of the AC motor and the types are referred to as a three-level type, a five-level type, and the like according to the number of quantization levels of the AC voltage waveform. Because control methods for the power conversion device are different from each other according to the type of drive system, the control device for controlling the power conversion device may be designed exclusively according to the type of drive system.

CITATION LIST

Patent Document

[Patent Document 1]
Japanese Patent No. 5952623

SUMMARY OF INVENTION

Technical Problem

An objective of the present invention is to provide a drive system and a control device for the drive system for enabling a component related to a control device for controlling a power conversion device to be shared regardless of the number of quantization levels of a voltage waveform applied to a winding of an AC motor by the power conversion device.

Solution to Problem

According to an embodiment, there is provided a drive system for driving a multi-phase alternating current (AC) motor having a plurality of windings. The drive system includes a first power converter, a second power converter, a first conversion controller, and a second conversion controller. The first power converter causes a current to flow through a winding of a first phase of the multi-phase AC motor. The second power converter causes a current to flow through a winding of a second phase of the multi-phase AC motor. The first conversion controller decides on either a three-level phase voltage waveform or a five-level phase voltage waveform on the basis of setting information for designating a type of phase voltage waveform and controls the first power converter so that the decided phase voltage waveform is output from the first power converter. The second conversion controller controls the second power converter so that a phase voltage waveform having the same type as the phase voltage waveform of the first power converter is output from the second power converter on the basis of the setting information for designating the type of phase voltage waveform.

DESCRIPTION OF EMBODIMENTS

Hereinafter, a drive system and a control device for the drive system of embodiments will be described with reference to the drawings. In the following description, the same reference signs are given to components having the same or similar functions.

"Connection" described here is not limited to the case of a physical connection, and also includes the case of an electrical connection.

First Embodiment

First, a drive system 1 of an embodiment will be described.

Figure 1:
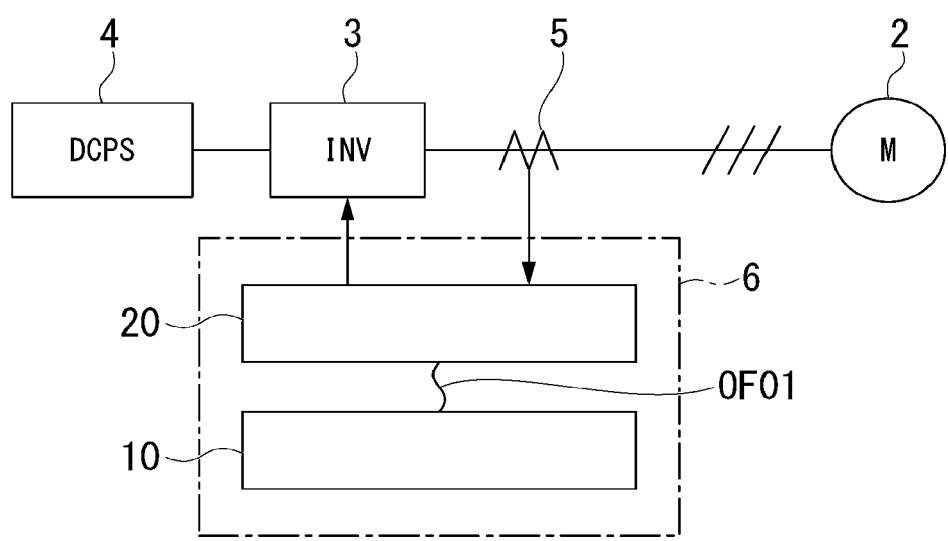
FIG. 1 is a configuration diagram of a drive system of a first embodiment.

FIG. 1 is a block diagram showing the drive system 1 of the first embodiment.

The drive system 1 includes an AC motor 2 (denoted by M in FIG. 1), a converter 3 (denoted by INV in FIG. 1), a direct current (DC) power supply 4 (denoted by DCPS in FIG. 1), a current detector 5, and a control device 6. The drive system 1 drives the AC motor 2 by supplying multi-phase AC power from the converter 3 to the AC motor 2. The AC motor 2 is an example of a multi-phase AC motor, and is, for example, a three-phase AC motor in which three windings are connected in a Y shape. The converter 3 is an example of a power conversion device.

For example, the DC power supply 4, which is the power supply of the drive system 1, supplies DC power to the converter 3 via a set of DC links connected to an output side thereof. For example, the DC power supply 4 is generally a diode rectifier or a PWM converter having an input of the AC voltage of the AC power supply, but the type of DC power supply 4 does not matter. For example, a DC link is configured as a set of a positive electrode, a negative electrode, and an electrode having a midpoint potential.

The converter 3 is an example of a conversion device (an inverter) including a plurality of switching elements. The converter 3 generates an AC voltage based on the DC voltage supplied from the DC power supply 4 by turning on/off each switching element in accordance with a pulse command signal and causes an AC to flow through a winding of the AC motor 2. For example, the converter 3 receives a pulse command signal based on PWM control from the gate controller 20 and regulates an amount of conversion from the DC power into AC power. The AC motor 2 is driven in accordance with an AC voltage output by the converter 3.

The current detector 5 detects an output current of the converter 3 and outputs a feedback signal that is fed back to the main controller 10 via the gate controller 20. This feedback signal is converted into a digital signal by an analog/digital converter (not shown).

The control device 6 includes a main controller 10 and a gate controller 20.

The control device 6 is divided into the main controller 10 and the gate controller 20 provided on the converter 3 side of the main controller 10. The main controller 10 and the gate controller 20 are insulated from each other. For example, the main controller 10 and the gate controller 20 are communicatively connected via a communication path using an optical fiber OF01 or the like. The main controller 10 controls the entire drive system 1. The gate controller 20 is subjected to control from the main controller 10 and controls a state of each phase. Although the gate controller is described as one body in FIG. 1, the gate controller 20 is divided in association with phases as will be described below. Details of the main controller 10, the gate controller 20, and the communication path will be described below.

The drive system 1 can be applied to several embodiment examples in which the configuration of the converter 3 is different. For example, a drive system 1A that outputs a three-level type voltage waveform and a drive system 1B that outputs a three-level or five-level type voltage waveform are embodiment examples. Hereinafter, these will be described sequentially. Also, the three-level type voltage waveform and the five-level type voltage waveform are three-phase AC phase voltage waveforms. When the three-level type voltage waveform is output as a phase voltage, the line voltage of a three-phase AC has five levels. The above line voltage corresponds to a voltage between the terminals corresponding to phases. On the other hand, the five-level type voltage waveform described in the present embodiment is the three-phase AC phase voltage waveform as described above. For example, a first terminal TU, a second terminal TV, and a third terminal TW to be described below are examples of terminals corresponding to the above phases.

The drive system 1 can be applied to a form in which a plurality of types of phase voltage waveforms whose level values are different from each other are generated. For example, the drive system 1 is configured so that components related to the control device 6 for controlling the converter 3 can be shared regardless of the number of quantization levels of the voltage waveform.

(Main Circuit of Three-Level Type Converter)

Figure 2:
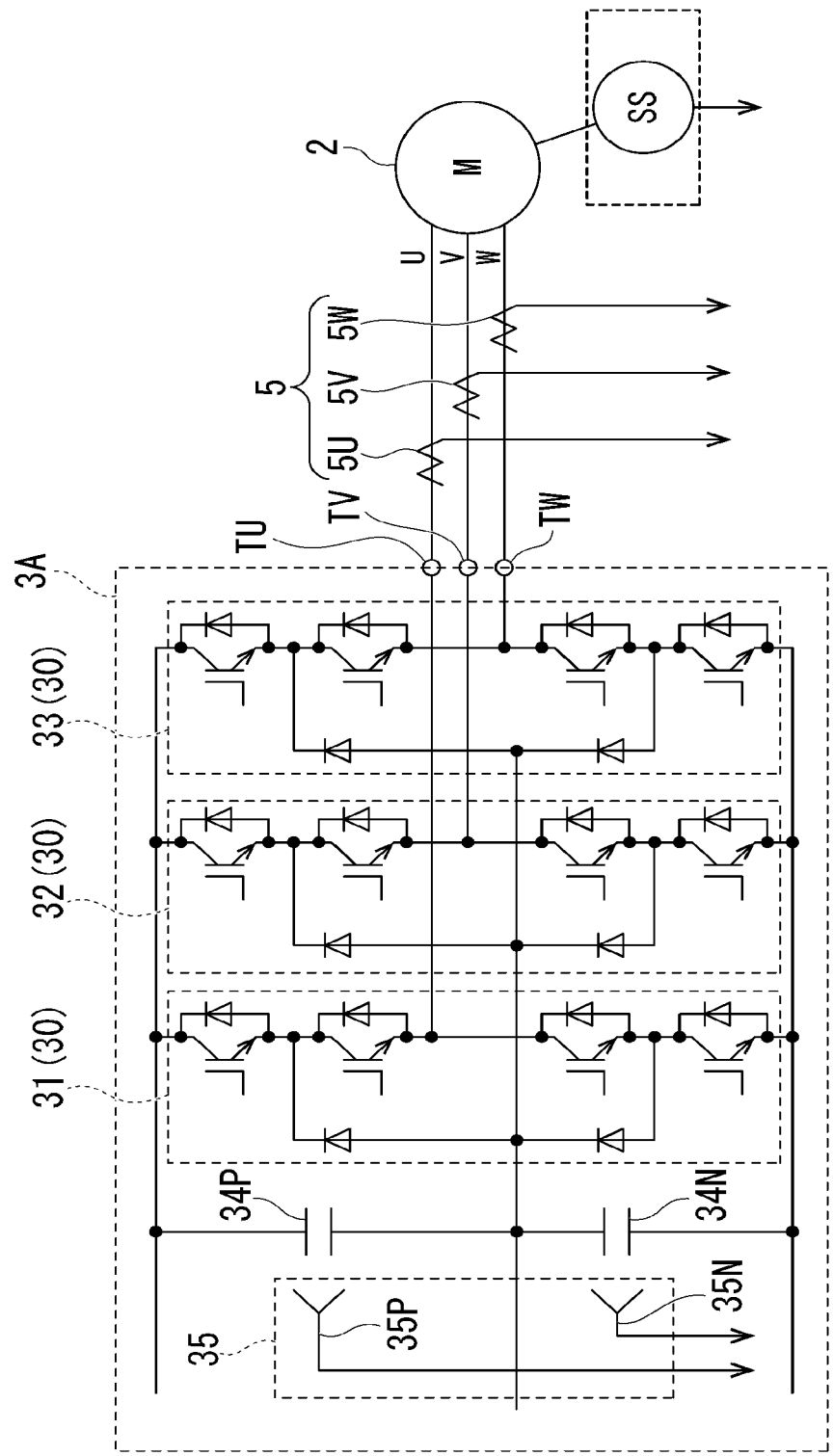
FIG. 2 is a configuration diagram of a main circuit of a three-level converter of a first embodiment example of the first embodiment.

A main circuit of a three-level type power converter 3A will be described as a first embodiment example of the first embodiment with reference to FIG. 2. FIG. 2 is a configuration diagram of the main circuit of the three-level type power converter 3A of the first embodiment example of the first embodiment.

The three-level type power converter 3A includes legs 31 to 33, capacitors 34P and 34N, and a voltage detector 35. The three-level type power converter 3A includes a first terminal TU, a second terminal TV, and a third terminal TW as output terminals for a three-phase AC.

For example, the legs 31 to 33 are associated with the U-phase, the V-phase, and the W-phase of the three-phase AC. The leg 31 causes a current to flow through a winding of the U-phase (a first phase) of the AC motor 2. The leg 32 causes a current to flow through a winding of the V-phase (a second phase) of the AC motor 2. The leg 33 causes a current to flow through a winding of the W-phase of the AC motor 2.

For example, each of the legs 31 to 33 includes one neutral point clamp (NPC) type leg. When the legs 31 to 33 are collectively shown without being distinguished, they are referred to as a leg 30. The leg 30 shown in FIG. 2 is an example of an NPC-type leg and includes four switching elements constituting the leg 30, reflux diodes in anti-parallel thereto, and a pair of diodes for limiting a potential of an output terminal of the leg 30 on the basis of a midpoint potential. The three-level type power converter 3A includes a total of 12 switching elements. The switching element shown in FIG. 2 is, but is not limited to, an insulated gate bipolar transistor (IGBT), and may be another type of semiconductor switching device.

A capacitor 34P is provided between a positive electrode of the DC link and a midpoint potential electrode, and a capacitor 34N is provided between a negative electrode of the DC link and the midpoint potential electrode. The capacitors 34P and 34N smooth a DC voltage applied to the DC link.

The voltage detector 35 includes a positive electrode side voltage detector 35P and a negative electrode side voltage detector 35N. The positive electrode side voltage detector 35P detects a terminal voltage of the capacitor 34P as a positive electrode side voltage. The negative electrode side voltage detector 35N detects a terminal voltage of the capacitor 34N as a negative electrode side voltage.

The current detector 5 includes, for example, current transformers 5U, 5V, and 5W. The current transformer 5U detects a current flowing through the first terminal TU connected to the winding of the U-phase of the AC motor 2. The current transformer 5V detects a current flowing through the second terminal TV connected to the winding of the V-phase of the AC motor 2. The current transformer 5W detects a current flowing through the third terminal TW connected to the winding of the W-phase of the AC motor 2. The current detected by the current detector 5 is equal to a phase current flowing through the winding of each phase and is equal to a current (a line current) of a line connected to each of the first terminal TU, the second terminal TV, and the third terminal TW.

Each of the above legs 31 to 33 includes one or more legs and generates a phase voltage waveform that is a three-level phase voltage waveform using the one or more legs included therein. The leg 31 outputs the generated first phase voltage waveform to the first terminal TU connected to the winding of the first phase. The leg 32 outputs the generated second phase voltage waveform to the second terminal TV connected to the winding of the second phase. The leg 33 outputs the generated third phase voltage waveform to the third terminal TW connected to the winding of the third phase.

(Main Circuit of NPC Type Power Converter)

Figure 3:
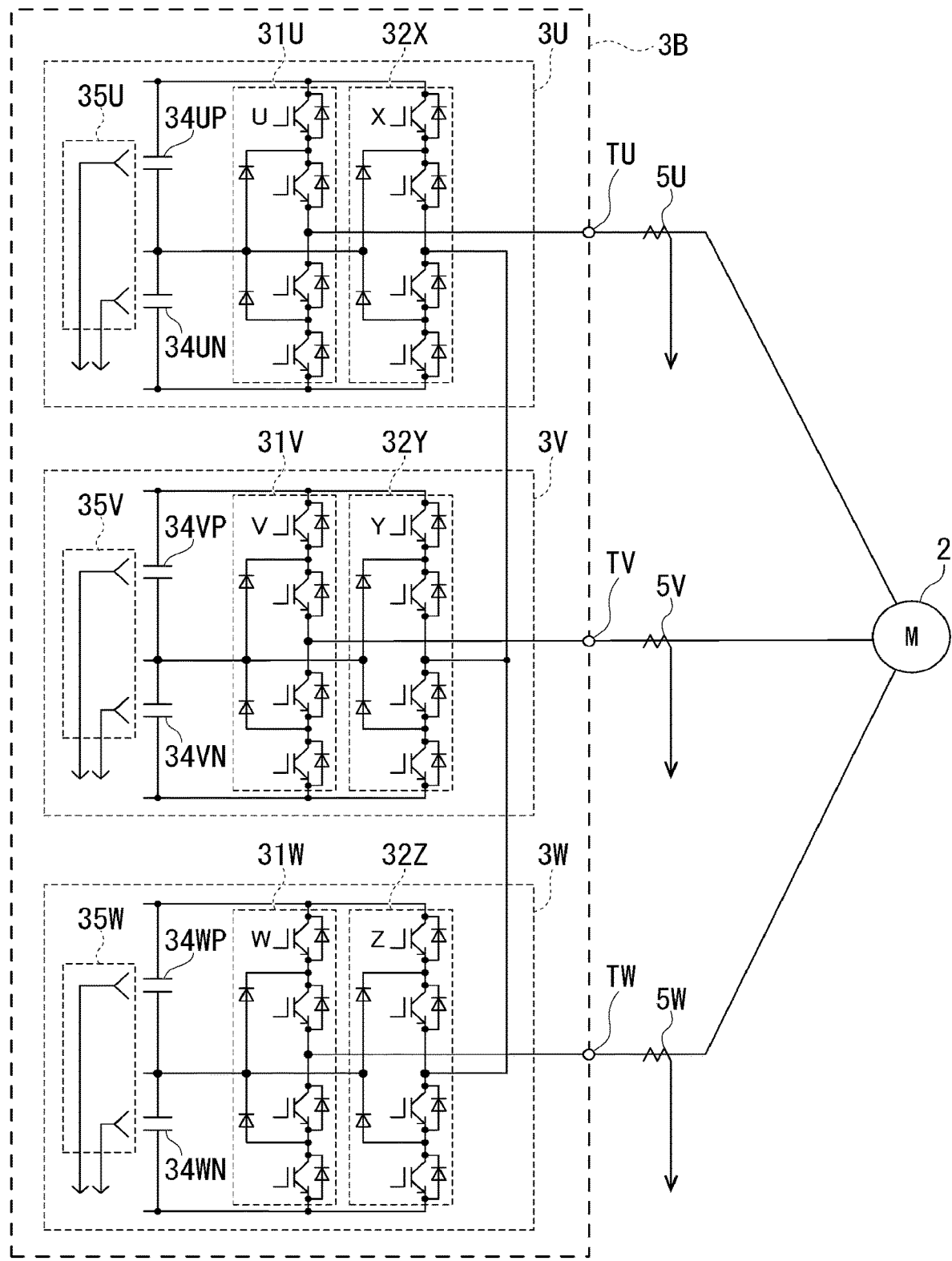
FIG. 3 is a configuration diagram of a main circuit of a neutral-point-clamped (NPC) type power converter of a second embodiment example of the first embodiment.

A main circuit of an NPC type power converter 3B will be described as a second embodiment example of the first embodiment with reference to FIG. 3. FIG. 3 is a configuration diagram of the main circuit of the NPC type power converter 3B of the second embodiment example of the first embodiment.

The NPC type power converter 3B includes a single-phase power converter 3U (a first power converter), a single-phase power converter 3V (a second power converter), and a single-phase power converter 3W (a third power converter) corresponding to the phases. The single-phase power converters 3U, 3V, and 3W are connected to DC power supplies 4U, 4V, and 4W independent of each other, respectively.

Figure 4A:
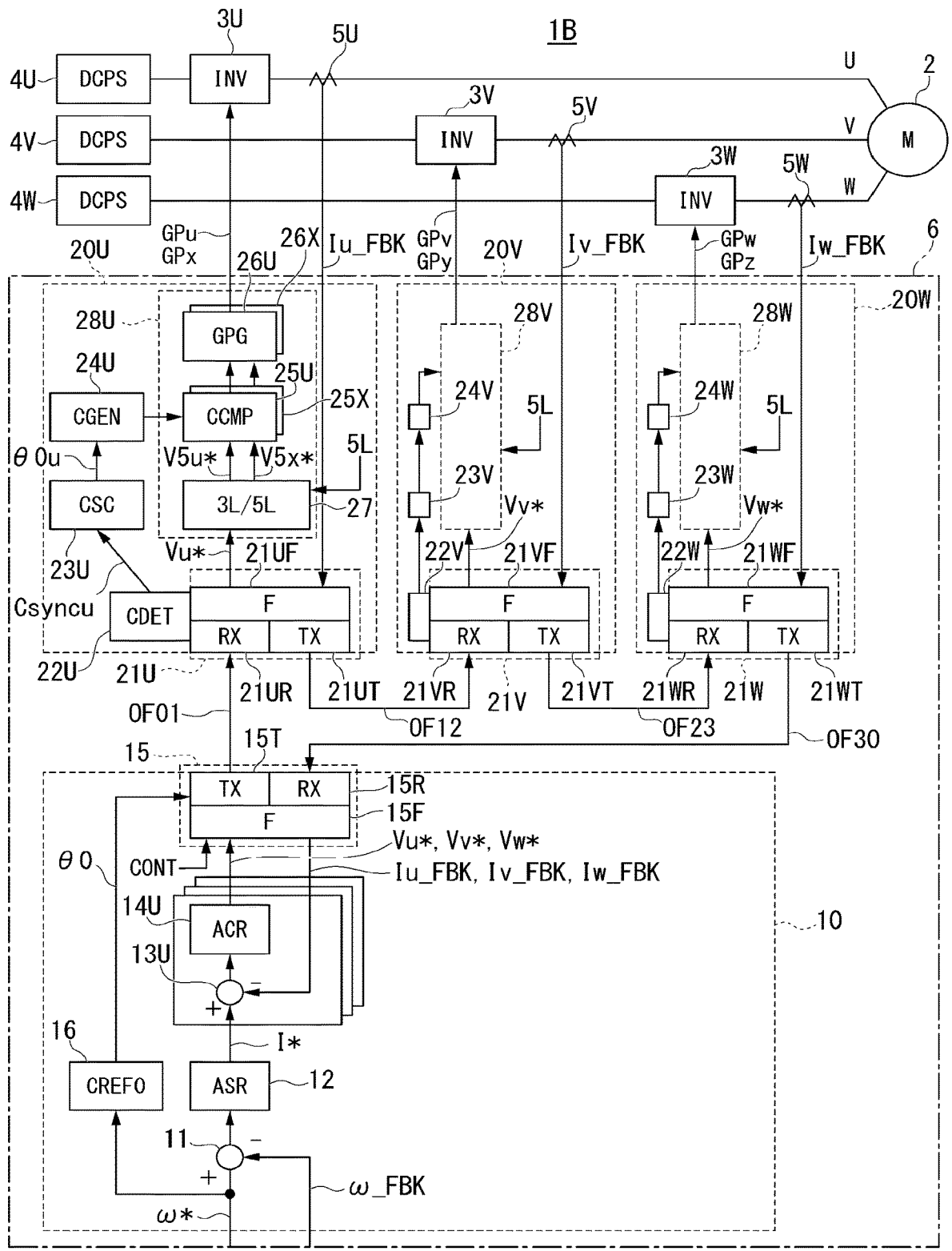
FIG. 4A is a configuration diagram of a controller of the first embodiment.

For example, the single-phase power converter 3U includes a leg 31U and a leg 32X. The leg 31U and the leg 32X are configured like the leg 30 described above. The legs 31U and 32X are connected to each other at their DC side midpoints and are connected to the midpoints of the U-phase DC power supply 4U (FIG. 4A). An AC side output of the leg 31U is connected to the first terminal TU. An AC side output of the leg 32X is connected to a neutral point N.

The single-phase power converter 3V includes a leg 31V and a leg 32Y. The leg 31V and the leg 32Y are configured like the leg 30 described above. The leg 31V and the leg 32Y are connected to each other at their DC side midpoints and are connected to the midpoint of the V-phase DC power supply 4V (FIG. 4A). An AC side output of the leg 31V is connected to the second terminal TV. An AC side output of the leg 32Y is connected to the neutral point N.

The single-phase power converter 3W includes a leg 31W and a leg 32Z. The leg 31W and the leg 32Z are configured like the leg 30 described above. The leg 31W and the leg 32Z are connected to each other at their DC side midpoints and are connected to the midpoint of the W-phase DC power supply 4W (FIG. 4A). An AC side output of the leg 31W is connected to the third terminal TW. An AC side output of the leg 32Z is connected to the neutral point N.

The single-phase power converter 3U will be described as a representative of the single-phase power converters 3U, 3V, and 3W. The single-phase power converter 3U has the leg 31U and the leg 32X to form a circuit in which a double voltage can be applied to the winding. For example, the positive electrode side arm of the leg 31U and the negative electrode side arm of the leg 32X are allowed to be conductive simultaneously, so that a voltage corresponding to a sum of an absolute value of the positive electrode side voltage and an absolute value of the negative electrode side voltage of the DC link is generated for a voltage of the first terminal TU for a voltage at the neutral point N on the three-phase AC side (referred to as a neutral point voltage). If the polarity of the arm allowed to be conductive is changed, a voltage having the opposite polarity to the above is generated. As a result, for example, the voltage of the first terminal TU (the U-phase voltage) for the neutral point voltage has three levels obtained by multiplying the absolute value of the positive electrode side voltage of the DC link by 2, 0, and −2.

Further, a voltage corresponding to the absolute value of the positive electrode side voltage or the absolute value of the negative electrode side voltage of the DC link is generated with the voltage of the first terminal TU for the neutral point voltage by setting one of a positive electrode side arm and a negative electrode side arm of one of the leg 31U and the leg 32X in a conductive state and setting the other arm in a state in which the midpoint potential on the DC side is output. If the polarity of the arm allowed to be conductive is changed, a voltage having the opposite polarity to the above is generated. As a result, for example, two levels obtained by multiplying the absolute value of the positive electrode side voltage of the DC link by 1 and −1 can be applied to the voltage of the first terminal TU (the U-phase voltage) for the neutral point voltage. Thereby, the voltage of the first terminal TU (U-phase voltage) for the neutral point voltage has five levels obtained by multiplying the absolute value of the positive electrode side voltage of the DC link by 2, 1, 0, −1, and −2.

As described above, the single-phase power converter 3U can generate a three-level phase voltage or a five-level phase voltage according to the pattern of the gate pulse that is supplied. In relation to this, the cases of the single-phase power converters 3V and 3W are also similar to the case of the single-phase power converter 3U.

Each of the single-phase power converters 3U, 3V, and 3W includes a plurality of legs 30 and generates a phase voltage waveform of either the three-level phase voltage waveform or the five-level phase voltage waveform using the plurality of legs 30 included therein.

The single-phase power converter 3U outputs the generated first phase voltage waveform to the first terminal TU connected to the winding of the first phase and the single-phase power converter 3V outputs the generated second phase voltage waveform to the second terminal TV connected to the winding of the second phase. The single-phase power converter 3W outputs the generated third phase voltage waveform to the third terminal TW connected to the winding of the third phase.

Although the NPC type power converter 3B has been described above as the single-phase power converters 3U, 3V, and 3W, the above-described three-level type power converter 3A may be applied as the single-phase power converters 3U, 3V, and 3W. When the single-phase power converters 3U, 3V, and 3W are configured using three three-level type power converters 3A, one leg 30 remains for each of the single-phase power converters 3U, 3V, and 3W. In this case, it is only necessary for the single-phase power converters 3U, 3V, and 3W to each use any two legs 30 therein. Thereby, the components of the converter 3 can be shared.

The control device 6 of the first embodiment will be described with reference to FIG. 4A. FIG. 4A is a configuration diagram of the control device 6 of the first embodiment. The main controller 10 within the control device 6 will be first described and then the gate controller 20 will be described.

(Main Controller)

The main controller 10 includes a subtractor 11, a speed controller 12 (denoted by ASR in FIG. 4A), a subtractor 13 (not shown), a current controller 14 (not shown), a serial transceiver 15, and a reference carrier generator 16 (denoted by CREFO in FIG. 4A). The subtractor 11, the speed controller 12, the serial transceiver 15, and the reference carrier generator 16 are provided in common for the phases and the subtractor 13 and the current controller 14 are provided as a pair for each phase. Although a U-phase subtractor 13U and a current controller 14U (denoted by ACR in FIG. 4A) are shown as representatives of the subtractor 13 and the current controller 14 in FIG. 4A, the same is also true for the V-phase and the W-phase.

An input of the subtractor 11 is supplied with a speed command value ω* and a speed feedback value ω_FBK from a higher-order device (not shown) and the subtractor 11 calculates a difference (speed deviation) between the speed command value ω* and the speed feedback value ω_FBK. Here, the speed feedback value ω_FBK may be either an output value of a speed detector SS (not shown) connected to the AC motor 2 or a speed estimate estimated by the control device 6 from the characteristics of the AC motor 2. When the output value of the speed detector SS is used, the output value of the speed detector SS may be fed back as a speed feedback signal to the main controller 10 via the gate controller 20.

The speed controller 12 performs control so that the speed deviation is minimized and generates a reference current value I*. The speed controller 12 provides the reference current value I* to a first input of the subtractor 13U.

A second input of the subtractor 13U is supplied with a current feedback value Iu_FBK. The subtractor 13U calculates a difference (current deviation) between the reference current value I* and the current feedback value Iu_FBK. Here, the current feedback value Iu_FBK is a signal to be transmitted to the main controller 10 via the serial transceivers 21U, 21V, and 21W to be described below after a physical quantity detected by the current transformer 5U is subjected to an analog/digital conversion process inside of the gate controller 20.

The current controller 14U performs control so that the current deviation is minimized and generates a reference voltage value Vu* for U-phase control. The reference voltage value Vu* is serially transmitted from a transmitter 15T of the serial transceiver 15 to be described below to a serial reception portion of the serial transceiver 21U.

A set of the subtractor 13U and the current controller 14U is applied to the U-phase. In addition to the set of the subtractor 13U and the current controller 14U shown in FIG. 4A, there are a set of a subtractor 13V and a current controller 14V applied to the V-phase and a set of a subtractor 13W and a current controller 14W applied to the W-phase not shown in FIG. 4A. The subtractor 13V and the current controller 14V generate a reference voltage value Vv* on the basis of the reference current value I* and a current feedback value Iv_FBK. The subtractor 13W and the current controller 14W generate a reference voltage value Vw* on the basis of the reference current value I* and a current feedback value IW_FBK.

In parallel with this, the reference carrier generator 16 generates a reference carrier signal θ0 on the basis of the speed command value ω* (a reference speed). The reference carrier signal θ0 is a signal indicating a reference timing. The serial transceiver 15 enables bidirectional communication using an optical fiber.

For example, the serial transceiver 15 includes the transmitter 15T (denoted by TX), a receiver 15R (denoted by RX), and a multiplexing/demultiplexing unit 15F. A network side of the transmitter 15T is connected to the serial transceiver 21U of the gate controller 20 through an optical fiber OF01. A network side of the receiver 15R is connected to the serial transceiver 21W of the gate controller 20 through an optical fiber OF30.

The transmitter 15T includes an electrical-optical converter. The multiplexing/demultiplexing unit 15F acquires the reference voltage value Vu* generated by the current controller 14U, the reference voltage value Vv* generated by the current controller 14V, and the reference voltage value Vw* generated by the current controller 14W and generates transmission data (TXD) in which data thereof is multiplexed. The transmitter 15T generates and outputs an optical signal based on the transmission data TXD using the electrical-optical converter. The transmitter 15T may transmit a control command CONT multiplexed by the multiplexing/demultiplexing unit 15F.

For example, when the reference carrier signal θ0 reaches a prescribed phase within one period of a control cycle, the transmitter 15T starts the serial transmission of the transmission data TXD to the serial transceiver 21U. The reference voltage value Vu*, the reference voltage value Vv*, and the reference voltage value Vw* are examples of data included in the transmission data TXD and the present invention is not limited thereto. The transmission data TXD for the gate controller 20 may include data in addition to or in place of the reference voltage value Vu*, the reference voltage value Vv*, and the reference voltage value Vw* described above. In the following description, this may be simplified and described as "The transmitter 15T transmits the reference voltage value Vu*, the reference voltage value Vv*, and the reference voltage value Vw*."

The receiver 15R includes an optical-electrical converter. The receiver 15R receives an optical signal of received data RXD to be transmitted serially and converts the received data RXD into an electrical signal using the optical-electrical converter. For example, the received data RXD includes a current feedback value Iu_FBK, a current feedback value Iv_FBK, and a current feedback value Iw_FBK. The receiver 15R supplies data of these current feedback values to the multiplexing/demultiplexing unit 15F. The multiplexing/demultiplexing unit 15F demultiplexes these current feedback values into data and outputs the data. In the following description, this may be simplified and described as "The receiver 15R receives the current feedback value Iu_FBK, the current feedback value Iv_FBK, and the current feedback value Iw_FBK."

For example, even if the control device 6 drives the three-level type power converter 3A or even if the control device 6 drives the NPC type power converter 3B, the main controller 10 may perform a control process on the basis of the reference voltage value Vu*, the reference voltage value Vv*, and the reference voltage value Vw*. The main controller 10 uses the reference voltage value Vu* and the reference voltage value Vv* and the reference voltage value Vw* for controlling both the three-level type power converter 3A and the NPC type power converter 3B. Further, the main controller 10 uses the reference voltage value Vu*, the reference voltage value Vv*, and the reference voltage value Vw* for both three-level type voltage control and five-level type voltage control.

(Gate Controller)

The gate controller 20 includes a gate controller 20U (a first conversion controller), a gate controller 20V (a second conversion controller), and a gate controller 20W (a third conversion controller). The gate controllers 20U, 20V, and 20W are provided in association with AC phases. The gate controllers 20U, 20V, and 20W include the main controller 10 described above and are connected to each other via optical fibers.

Hereinafter, the gate controller 20U will be exemplified and described.

The gate controller 20U includes a serial transceiver 21U, a reception detection portion 22U (denoted by CDET in FIG. 4A), a carrier synchronization controller 23U (denoted by CSC in FIG. 4A), a carrier generator 24U (denoted by CGEN in FIG. 4), a carrier comparator 25U (denoted by CCOMP in FIG. 4A), a carrier comparator 25X, a gate circuit portion 26U (denoted by GPG in FIG. 4A), a gate circuit portion 26X, and a reference voltage converter 27U (denoted by 3L/5L in FIG. 4A). The carrier comparator 25U, the carrier comparator 25X, the gate circuit portion 26U, the gate circuit portion 26X, and the reference voltage converter 27U are collectively referred to as a U-phase gate signal generator 28U.

An example of a configuration of the serial transceiver 21U will be described with reference to FIG. 4B.

Figure 4B:
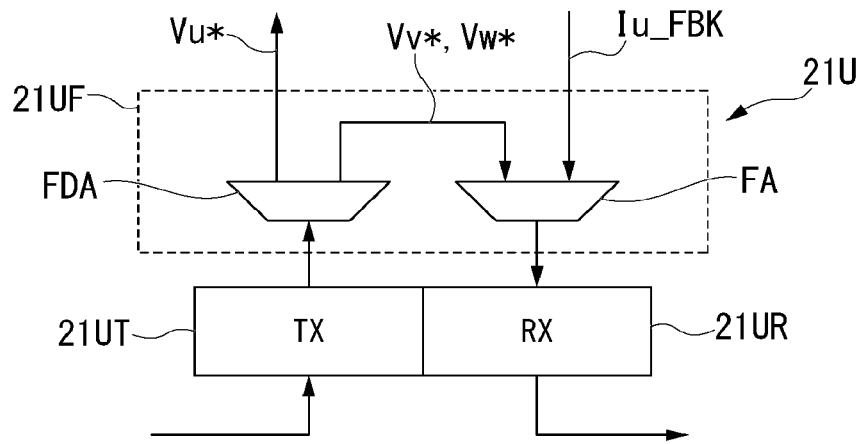
FIG. 4B is a configuration diagram of a serial transceiver of the first embodiment.

FIG. 4B is a configuration diagram of the serial transceiver 21U of the embodiment.

For example, the serial transceiver 21U includes a transmitter 21UT (denoted by TX), a receiver 21UR (denoted by RX), and a multiplexing/demultiplexing unit 21UF. The transmitter 21UT and the receiver 21UR correspond to the transmitter 15T and the receiver 15R.

The multiplexing/demultiplexing unit 21UF includes a frame separation unit FDA and a frame assembly unit FA. For example, the multiplexing/demultiplexing unit 21UF may implement the frame separation unit FDA and the frame assembly unit FA when a processor such as a CPU is included and the processor executes a prescribed program or may implement the frame separation unit FDA and the frame assembly unit FA using a combination of electric circuits. The multiplexing/demultiplexing unit 21UF performs each data transmission process using a storage area of a storage portion (not shown).

For example, the receiver 21UR receives an optical signal of a serially transmitted frame from the main controller 10 and converts the optical signal into an electrical signal. The receiver 21UR supplies the received frame to the frame separation unit FDA of the multiplexing/demultiplexing unit 21UF. The frame separation unit FDA separates data within the frame supplied from the receiver 21UR and outputs the separated data. For example, data within the frame includes data related to command values such as the reference voltage value Vu*, the reference voltage value Vv*, and the reference voltage value Vw*.

For example, the transmitter 21UT converts the electrical signal of the frame generated by the frame assembly unit FA of the multiplexing/demultiplexing unit 21UF into an optical signal using an optical-electrical converter and outputs the optical signal.

The frame assembly unit FA of the multiplexing/demultiplexing unit 21UF generates the above-described frame on the basis of the data separated by the frame separation unit FDA and the data transmitted from the gate controller 20U and causes the generated frame to be transmitted to a subsequent stage at a prescribed timing.

For example, the multiplexing/demultiplexing unit 21UF extracts a part of the data from the electrical signal output by the receiver 21UR and supplies the extracted data to the transmitter 21UT. The multiplexing/demultiplexing unit 21UF acquires the current feedback value Iu_FBK detected by the current transformer 5U, assigns data including the above-described part of the data and the above-described current feedback value Iu_FBK to a frame and outputs the frame after the data is multiplexed. The transmitter 21UT transmits the frame including the data multiplexed by the multiplexing/demultiplexing unit 21UF to the gate controller 20V of the next stage.

Also, the frame for use in communication is further used to transmit timing information of the reference carrier signal 00. The receiver 21UR extracts the timing information for regulating the phase of the carrier signal from the above-described electrical signal and uses the timing information to control the gate controller 20U. Details of this will be described below.

The reference voltage converter 27U will be described with reference back to FIG. 4A.

The receiver 21UR supplies the extracted reference voltage value Vu* to the reference voltage converter 27U. Although the reference voltage value Vu* is received from the receiver 21UR, the reference voltage converter 27U changes a process when the five-level type is applied and the three-level type is applied on the basis of predetermined information or selection information decided by hardware settings. For example, as the selection information, selection information when the five-level type is applied is denoted by "5L" and selection information when the three-level type is applied is denoted by "3L." The reference voltage converter 27U shown in FIG. 4A is supplied with a 5L selection signal and is in a state in which the reference voltage converter 27U is applied to the five-level type.

Figure 5A:
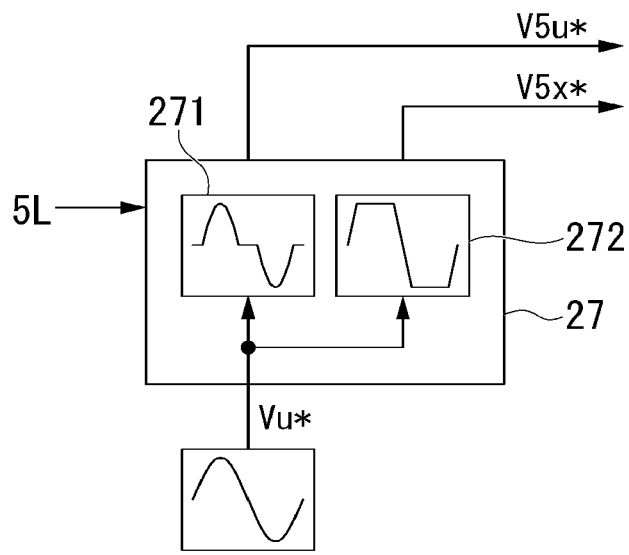
FIG. 5A is a diagram for describing a process when a five-level type of a reference voltage converter of the first embodiment is applied.
Figure 5B:
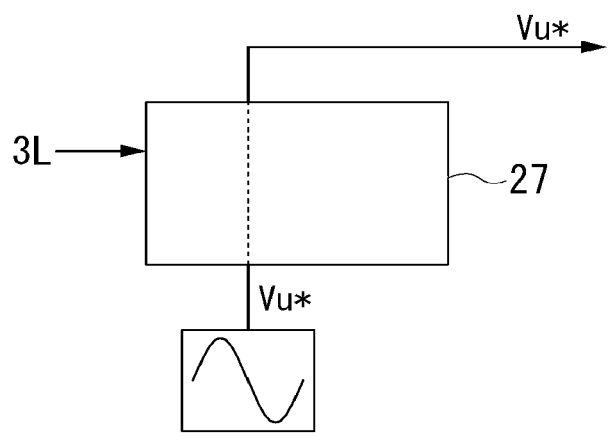
FIG. 5B is a diagram for describing a process when a three-level type of the reference voltage converter of the first embodiment is applied.

FIG. 5A is a diagram for describing a process when the five-level type of the reference voltage converter 27U of the first embodiment is applied. FIG. 5B is a diagram for describing a process when the three-level type of the reference voltage converter 27U of the first embodiment is applied.

As shown in FIG. 5A, the reference voltage converter 27U includes a conversion processing portion 271 and a conversion processing portion 272. When a setting process has been performed so that the reference voltage converter 27U is applied to the five-level type, functions of the conversion processing portion 271 and the conversion processing portion 272 are activated. For example, the conversion processing portion 271 converts the reference voltage value Vu* into the reference voltage value V5u* and the conversion processing portion 272 converts the reference voltage value Vu* into the reference voltage value V5x*. Thereby, the reference voltage value Vu* is converted into the reference voltage value V5u* and the reference voltage value V5x* by the reference voltage converter 27U set as the five-level type.

The reference voltage value V5u* is an example of a reference voltage supplied from the reference voltage converter 27U to the carrier comparator 25U. For example, when the reference voltage value Vu* is sinusoidal, the conversion processing portion 271 generates the reference voltage value V5u* obtained by converting an amplitude of the phase having an amplitude relatively close to 0 into 0. The reference voltage value V5x* is an example of a reference voltage supplied from the reference voltage converter 27X to the carrier comparator 25X. In the above-described case, the conversion processing portion 272 generates the reference voltage value V5x* by converting an amplitude of a range having a relatively large amplitude into a saturated value.

On the other hand, as shown in FIG. 5B, when a 3L selection signal is supplied to the reference voltage converter 27U, a setting process for applying the reference voltage converter 27U to the three-level type is performed. In this case, the functions of the conversion processing portion 271 and the conversion processing portion 272 are deactivated, the reference voltage value Vu* is not converted into the reference voltage value V5u* and the reference voltage value V5x*, and the reference voltage value Vu* is output.

The gate controller 20U controls the single-phase power converter 3U on the basis of first selection information for designating either a three-level phase voltage waveform or a five-level phase voltage waveform. The gate controller 20V controls the single-phase power converter 3V on the basis of second selection information for designating a phase voltage waveform having the same type as the phase voltage waveform designated in the first selection information. The gate controller 20W is similar to the gate controller 20V.

The carrier comparator 25U will be described with reference back to FIG. 4A.

The carrier comparator 25U creates a gate pulse command value GPu* by comparing a PWM carrier generated within the gate controller 20U in a method to be described below with the reference voltage value V5$u$* and supplies the gate pulse command value GPu* to the gate circuit portion 26U. The gate circuit portion 26U converts the gate pulse command value GPu* into a signal GPu for driving the switching element and supplies the signal GPu to the leg 31U of the converter 3. A gate of each switching element of the leg 31U may be supplied with the signal GPu directly or via a drive circuit not shown in FIG. 4A.

The carrier comparator 25X and the gate circuit portion 26X are configured like the carrier comparator 25U and the gate circuit portion 26U. For example, the carrier comparator 25X creates a gate pulse command value GPX* by comparing the reference voltage value V5$x$* with a PWM carrier and supplies the gate pulse command value GPx* to the gate circuit portion 26X. The gate circuit portion 26X converts the gate pulse command value GPx* into a signal GPx for driving the switching element and supplies the signal GPx to the leg 32X of the converter 3.

The timing information of the reference carrier signal θ0 is supplied from the receiver 21UR to the reception detection portion 22U, and the reception detection portion 22U, the carrier synchronization controller 23U, and the carrier generator 24U generate a carrier signal in the gate controller 20U. Detailed description of the generation of the carrier signal will be described below.

Also, the processing time (the intra-node delay time) within the gate controller 20U from the time at which the receiver 21UR detects the above-described electrical signal to the time at which the transmitter 21UT transmits the corresponding signal has a value determined by design.

The above is schematic description of the gate controller 20U.

The gate controller 20V includes a serial transceiver 21V, a reception detection portion 22V, a carrier synchronization controller 23V, a carrier generator 24V, and a V-phase gate signal generator 28V. The serial transceiver 21V, the reception detection portion 22V, the carrier synchronization controller 23V, the carrier generator 24V, and the V-phase gate signal generator 28V in the gate controller 20V are configured to be equivalent to the serial transceiver 21U, the reception detection portion 22U, the carrier synchronization controller 23U, the carrier generator 24U, and the U-phase gate signal generator 28U in the gate controller 20U.

For example, the serial transceiver 21V includes a transmitter 21VT (denoted by TX), a receiver 21VR (denoted by RX), and a multiplexing/demultiplexing unit 21VF. A configuration of the serial transceiver 21V is equivalent to that of the serial transceiver 21U.

The gate controller 20W includes a serial transceiver 21W, a reception detection portion 22W, a carrier synchronization controller 23W, a carrier generator 24W, and a W-phase gate signal generator 28W. The serial transceiver 21W, the reception detection portion 22W, the carrier synchronization controller 23W, the carrier generator 24W, and the W-phase gate signal generator 28W in the gate controller 20W are configured to be equivalent to the serial transceiver 21U, the reception detection portion 22U, the carrier synchronization controller 23U, the carrier generator 24U, and the U-phase gate signal generator 28U in the gate controller 20U.

For example, the serial transceiver 21W includes a transmitter 21WT (denoted by TX), a receiver 21WR (denoted by RX), and a multiplexing/demultiplexing unit 21WF. A configuration of the serial transceiver 21W is equivalent to that of the serial transceiver 21U.

(Network)

Next, a network for use in communication within the drive system 1 will be described.

The topology of the network of the present embodiment is of a loop type in which the main controller 10, the gate controller 20U, the gate controller 20V, and the gate controller 20W are set as nodes and the above nodes are connected sequentially. This network is physically connected by the same path as in the topology described above. By using the optical fiber as the medium of this physical connection, the nodes are isolated from each other. For example, one optical fiber is provided between the nodes. The drive system 1 performs communication in one direction using the optical fiber. Also, each node may be able to perform communication in a full duplex mode.

As an example of the above physical connection configuration, the case where the above-described four nodes are connected sequentially using four optical fibers will be described in contrast to a comparative example. In this case, it can be seen that the number of optical fibers and the total extension required to configure the network of the present embodiment are sufficiently reduced when a first comparative example in which a connection between the switching element and the main controller 10 is a 1:1 connection and a second comparative example in which a connection between the main controller 10 and three other nodes is a 1:1 connection are compared with a connection configuration of the present embodiment.

Even if the network is configured as described above, a relationship between transmission and reception of information about a process in which the main controller notifies the gate controller 20 of the reference voltage and a process in which the main controller 10 collects the current feedback value from the gate controller 20 does not change. Therefore, the drive system 1 uses this network as a transmission path based on data multiplexing transmission. The network sequentially transmits the above-described data. In the data multiplexing transmission method, a known protocol may be used or may be appropriately selected.

The network using the optical fiber as a medium mutually connects the serial transceiver 15, the serial transceiver 21U, the serial transceiver 21V, and the serial transceiver 21W.

For example, in this network, the output of the transmitter 15T is connected to the input of the receiver 21UR through the optical fiber OF01. The output of the transmitter 21UT is connected to the input of the receiver 21VR through the optical fiber OF12. The output of the transmitter 21VT is connected to the input of the receiver 21WR through the optical fiber OF23. The output of the transmitter 21WT is connected to the input of the receiver 15R through the optical fiber OF30.

(Communication Method)

The drive system 1 uses the above-described network for communication between the main controller 10 and the gate controller 20U, communication between the gate controller 20U and the gate controller 20V, communication between the gate controller 20V and the gate controller 20V, and communication between the gate controller 20W and the main controller 10. The drive system 1 provides a communication path using a prescribed multiplexing structure for multiplexing data on the above-described network and uses the communication path. This communication path is formed using time division multiplexing of a physical layer of communication or frame multiplexing of a link layer.

As a communication method shown in the following embodiment, a burst transmission type communication method is exemplified. As a typical example of the burst transmission type communication method, a data multiplexing transmission method of performing communication in a state in which a plurality of pieces of data are included within one frame will be described. Also, each node in this network may be configured independently synchronously with respect to communication between nodes. One frame is an example of a unit multiplexing structure.

Figure 6:
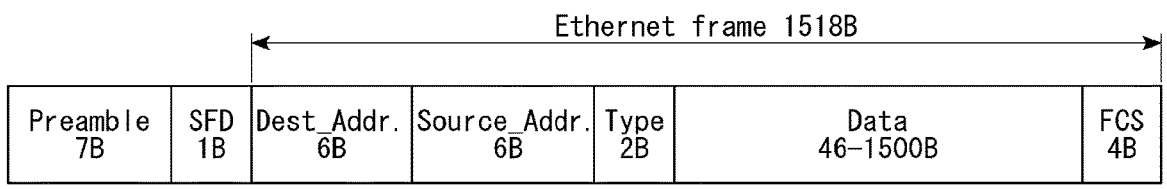
FIG. 6 is a diagram for describing a frame for use in communication of the first embodiment.

FIG. 6 is a diagram for describing a frame for use in communication according to the embodiment. The frame shown here is an Ethernet (R) frame exemplified as a protocol of the lower-order layer of serial communication. This frame is not limited to Ethernet (R). Alternatively, a frame of another standard protocol such as IEEE 802.3 or a non-standard protocol may be applied or non-procedural asynchronous communication may be used. This lower-layer protocol does not include a retransmission processing procedure.

In a higher-order layer protocol, as in a user datagram protocol (UDP), it is only necessary to use a protocol, which does not include a communication session establishment procedure and a retransmission processing procedure.

This Ethernet frame is used, for example, to transmit a reference voltage value (a reference voltage), a current feedback value (current FBK), a control command CONT (FIG. 4A), and the like. More specifically, the mapping of data within an Ethernet frame will be described.

A standard Ethernet frame includes destination address information (Dest_addr.), source address information (Source_addr), and the like in a field subsequent to a preamble (Pre.) and start detection data (SFD).

On the other hand, because the network of the present embodiment has a link-by-link configuration, each node assembles and forms a frame or disassembles a frame. Because it is not necessary to identify a destination and a source of the frame using the above-described address information in the case of the link-by-link connection, the destination address information (Dest_addr.) and the source address information can be omitted. Likewise, as long as there is no obstacle to communication, a part or all of the various information of type (Type) and error detection (FCS) defined in the Ethernet frame may be omitted or changed.

Figure 7:
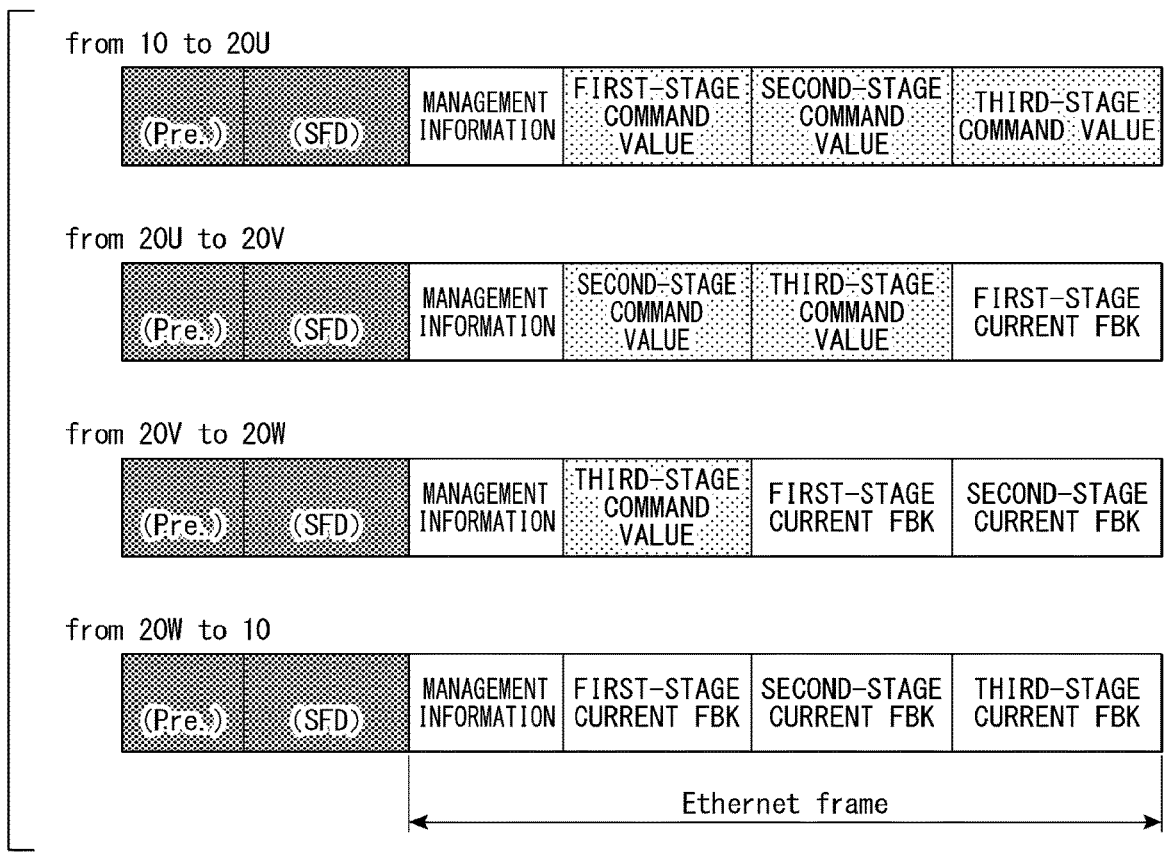
FIG. 7 is a diagram for describing a data structure within the frame of the first embodiment.

The data structure of the data mapped to the above frame will be described with reference to FIG. 7. FIG. 7 is a diagram for describing the data structure within the frame of the embodiment.

For example, a first example is a mapping example of a frame transmitted from the main controller 10 to the gate controller 20U. A second example is a mapping example of a frame transmitted from the gate controller 20U to the gate controller 20V. A third example is a mapping example of a frame transmitted from the gate controller 20V to the gate controller 20W. A fourth example is a mapping example of a frame transmitted from the gate controller 20W to the main controller 10.

Although the frame shown in FIG. 7 is based on the above-described Ethernet frame, management information, reference voltages for the gate controllers of first to third stages, and current feedback values (current FBK) from the gate controllers of the first to third stages are assigned to a range of the Ethernet frame subsequent to the preamble (Pre.) and the start detection data (SFD). The example shown here is an example of a case where the number of pieces of data to be transmitted and received (the number of pieces of data) is fixed.

For example, in the first example, following the management information, command values for the gate controllers of the first to third stages are assigned. In this case, the command values become reference voltages for the gate controllers 20 of the first to third stages (corresponding to Vu*, Vv*, and Vw* in FIG. 4A) or control commands CONT (FIG. 4A) for the gate controllers 20 of the first to third stages.

For example, the main controller 10 includes at least a reference voltage for the gate controller 20U, a reference voltage for the gate controller 20V, and a reference voltage for the gate controller 20W within the frame and transmits the frame. For example, the gate controller 20U includes at least reference voltages for the gate controller 20V and the gate controller 20W within one unit multiplexing structure (unit frame) and transmits the unit multiplexing structure (unit frame). The same is also true for the gate controllers 20V and 20W.

In the case of the second example, command values for the gate controllers of the second stage and the third stage and a current feedback value from the gate controller of the first stage (denoted by current FBK corresponding to Iu_FBK of FIG. 4A) are assigned. In this case, the command values are reference voltages of the second and third stages (corresponding to Vv* and Vw* in FIG. 4A) or control commands CONT of the second and third stages. The same is also true for the third and fourth examples. Also, the current feedback value from the gate controller may be collected at least once within the control cycle or the current feedback value may be omitted when communication is performed a plurality of times within the control cycle.

As described above, each gate controller 20 transmits data (transmission data) for use in the gate controllers 20 from the next stage within the received data to the gate controller 20 of the next stage.

Also, at the time of transmission to the next stage gate controller 20, the gate controller 20 also transmits the current feedback value of the gate controller 20 together with the above-described transmission data. This process is iterated and the current feedback value of each gate controller 20 is transmitted by the gate controller 20 subsequent to the associated gate controller 20 and returned to the main controller 10. Also, the feedback of this control may be within the control cycle of the converter 3.

Next, the synchronization of the PWM carrier will be described with reference to FIGS. 8 and 9.

Figure 8:
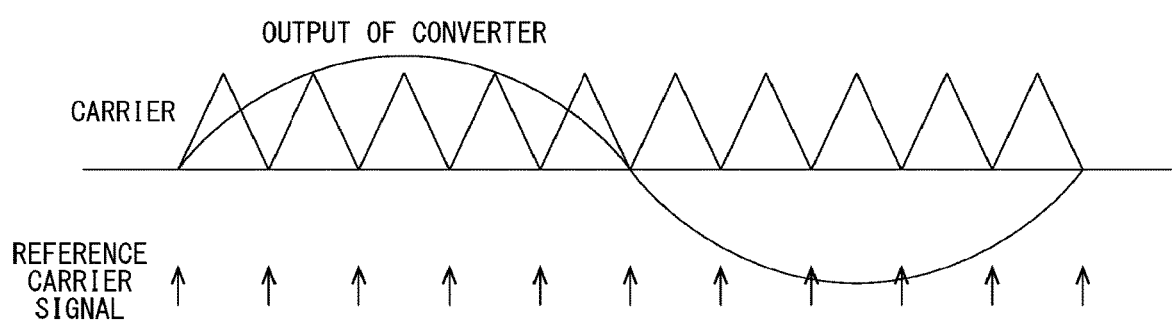
FIG. 8 is a diagram for describing a PWM carrier of the first embodiment.
Figure 9:
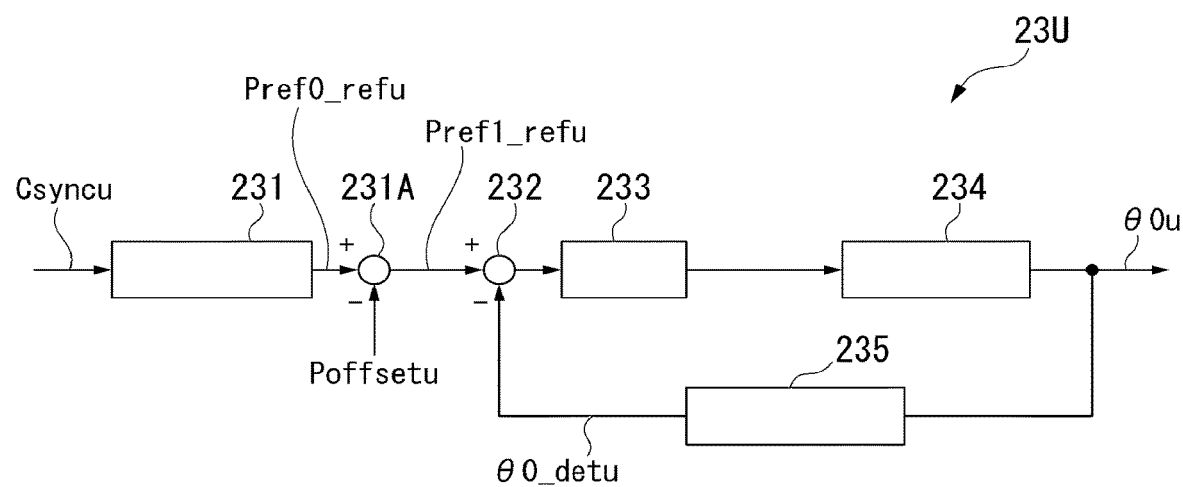
FIG. 9 is a configuration diagram of a carrier synchronization controller of the first embodiment.

FIG. 8 is a diagram for describing the PWM carrier of the embodiment.

Each gate controller 20 in the drive system 1 generates and uses a PWM carrier for PWM control. PWM carriers generated by the gate controllers 20 are required to align phases with each other. Hereinafter, a method in which the main controller 10 generates a reference carrier signal θ0 and each gate controller 20 synchronizes a PWM carrier with the reference carrier signal θ0 will be described.

For example, in the drive system 1, each communication node includes an independently synchronized processor. Processors communicate with each other using serial communication. The drive system 1 transmits the timing information of the reference carrier signal θ0 from the main controller 10 to each gate controller 20 using the serial communication.

As described above, the transmitter 15T of the main controller 10 starts serial transmission of transmission data TXD to the serial transceiver 21U of the gate controller 20U when the reference carrier signal θ0 reaches a prescribed phase within its period.

The gate controller 20U detects that a desired frame has arrived by detecting a prescribed data bit pattern based on serial communication and reproduces the timing information of the reference carrier signal 00.

For example, the reception detection portion 22U detects that a prescribed bit pattern has arrived by comparing the prescribed bit pattern with a predetermined data bit pattern, outputs a carrier synchronization signal Csyncu at the time of the detection, and supplies the carrier synchronization signal Csyncu to the carrier synchronization controller 23U. In this case, the prescribed bit pattern may include a preamble of the Ethernet frame, start detection data (SFD), and frame type identification information. The reception detection portion 22U may not output the carrier synchronization signal Csyncu when it is not detected that a prescribed bit pattern has arrived even if the reception of a frame is detected. The carrier synchronization controller 23U includes a PLL that generates a carrier phase. The carrier synchronization controller 23U regulates the phase of the carrier phase using the PLL and outputs the phase information θ0$u$ of the carrier phase, for example, so that synchronization is achieved at a timing when it is detected that the carrier synchronization signal Csyncu has been supplied. The phase information θ0$u$ corresponds to an amplitude value of the PWM carrier when the phase of the reference carrier signal θ0 is 0. The carrier generator 24U generates a triangular wave PWM carrier synchronized with the phase information θ0$u$ and supplies the triangular wave PWM carrier to the carrier comparators 25U and 25X.

When the transmitter 21UT of the gate controller 20U reaches a prescribed timing after the carrier synchronization signal Csyncu is output, the serial transmission of the transmission data TXD to the serial transceiver 21V of the gate controller 20V starts using a frame having the same type as the received frame.

Details of the carrier synchronization controller 23U will be described with reference to FIG. 9. FIG. 9 is a configuration diagram of the carrier synchronization controller 23U of the embodiment.

The carrier synchronization controller 23U includes a gate controller carrier phase shifter 231, a subtractor 231A, a subtractor 232, a controller 233, a carrier frequency regulator 234, and a reference carrier phase detector 235.

The gate controller carrier phase shifter 231 latches a value of a carrier phase within the gate controller 20 at a timing when the carrier synchronization signal Csyncu has been input. An output Pref0_refu of the gate controller carrier phase shifter 231 may include a delay set in the main controller 10, a delay due to transmission, and the like. For example, a state in which the phase is aligned when a magnitude of the output Pref0_refu is 0 is shown and a state in which the phase is shifted as a value of the output Pref0_refu increases is shown. The output Pref0_refu of the gate controller carrier phase shifter 231 as described above becomes a signal indicating how many carrier phases the gate controller 20 has when the carrier phase of the main controller 10 is 0. When the magnitude of the output Pref0_refu is not 0 as described above, it is indicated that the output Pref0_refu includes a phase error with respect to the carrier phase of the main controller 10. The carrier synchronization controller 23U compensates for the phase error using the subtractor 231A.

The subtractor 231A of the present embodiment calculates a compensation output Pref1_refu by subtracting an offset Poffsetu from the output Pref0_refu using the offset Poffsetu whose value is regulated according to the delay time generated in the output Pref0_refu.

The subtractor 232 compares a signal indicating the carrier phase of the gate controller 20 with the compensation output Pref1_refu (a corrected reference carrier phase) and provides deviation to the controller 233. The reference carrier phase detector 235 detects the above-described reference carrier phase from the output of the carrier frequency regulator 234. The carrier synchronization controller 23U regulates the deviation of the carrier phase to zero. In this way, the carrier synchronization controller 23U controls a generation timing of the PWM carrier generated by the carrier generator 24U.

Thereby, the gate controller 20U regulates the phase of the PWM carrier using a phase difference of a predetermined value when the PWM carrier is reproduced from the frame received from the main controller 10. The gate controller 20U generates a desired phase voltage waveform to synchronize with the reference timing on the basis of the received reference voltage for the gate controller 20U using a phase-regulated PWM carrier. Also, it is only necessary to configure the carrier synchronization controller 23V and the carrier synchronization controller 23W like the carrier synchronization controller 23U.

(Synchronization of Carrier Phase of Gate Controller 20)

In carrier synchronization control, the phase of the reference carrier signal θ0 is estimated from a timing when serial communication has been received, a phase difference between the estimated phase of the reference carrier signal θ0 and the PWM carrier of the gate controller 20 is taken, and an amount of change (a slope) in the amplitude of the PWM carrier is regulated so that the PWM carrier has the appropriate frequency.

In the case of the gate controllers 20 connected in a cascade form, each gate controller 20 assembles and disassembles the frame and relays the data. Thus, a reception start time of the frame received by each gate controller 20 is delayed as it becomes a gate controller 20 of a subsequent stage. When each gate controller 20 synchronizes the carrier phase on the basis of the received frame, the carrier phase of the gate controller 20 of the subsequent stage has a larger delay than the carrier phase of the main controller 10. Therefore, each gate controller 20 can compensate for the delay of the carrier phase of each gate controller 20 with respect to the phase of the reference carrier signal θ0 of the main controller 10 by removing an offset having a magnitude corresponding to the amount of delay of each stage from the amount of delay of each stage.

Thereby, it is possible to perform compensation so that a time difference due to the above-described amount of delay is eliminated in control of a switching timing of each power converter for controlling the gate controllers 20 connected in a cascade form.

(Data Relay Process Using Network of Cascade Connection)

Figure 10:
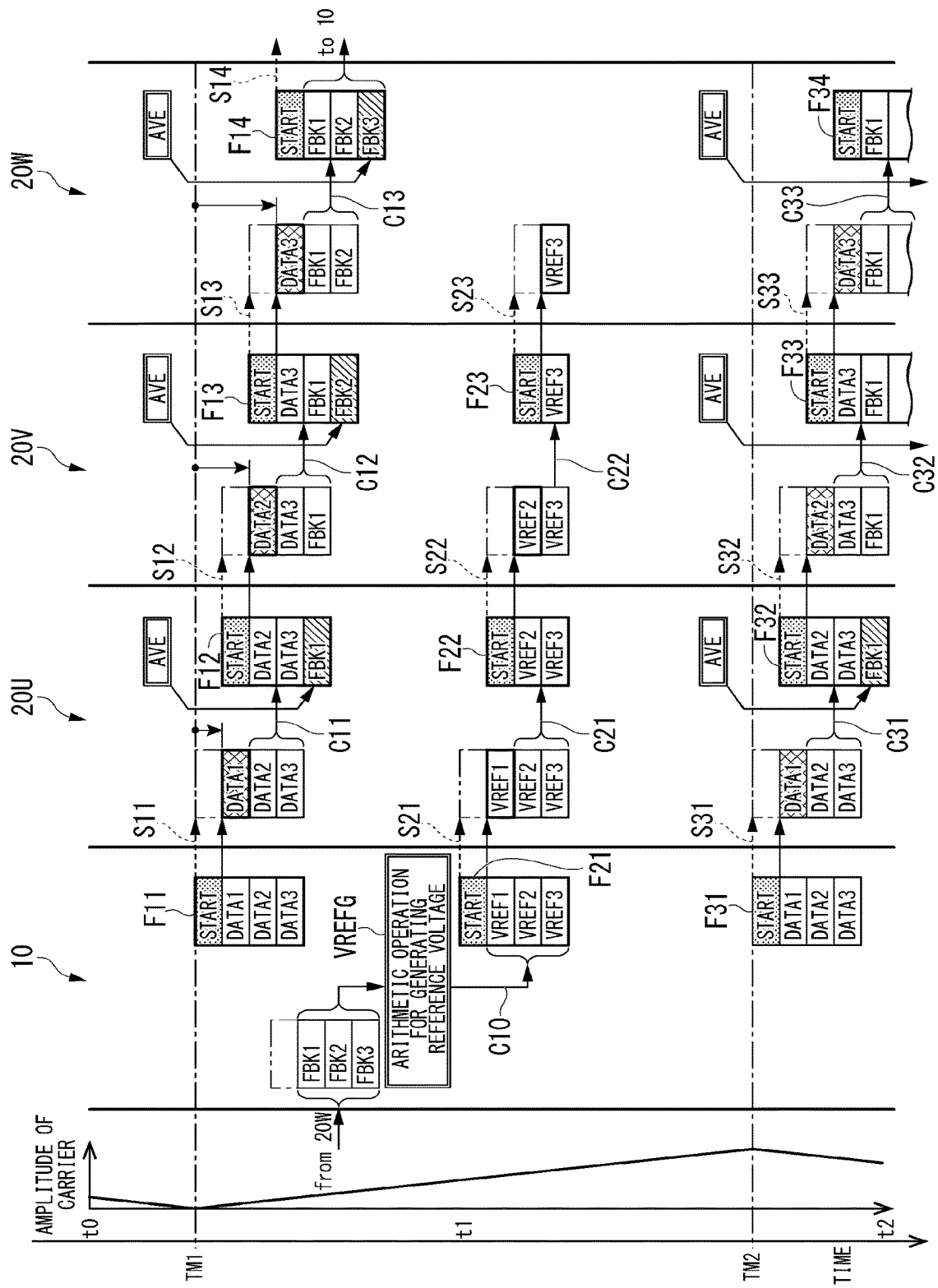
FIG. 10 is a diagram for describing a data relay process of the first embodiment.

A data relay process using a network using a cascade connection will be described with reference to FIG. 10. FIG. 10 is a diagram for describing the data relay process of the embodiment. A time axis is taken from top to bottom of FIG. 10 and a relationship between an example of the amplitude of the reference carrier signal θ0 at each time and a communication sequence between nodes is shown.

As shown in FIG. 8 described above, the main controller 10 generates a reference carrier signal θ0 whose amplitude changes in the form of a triangular wave. In FIG. 10, a change in the amplitude of the reference carrier signal θ0 within one control cycle is shown. A period from time TM1 to time TM2 corresponds to one period of one control cycle. For example, the amplitude of the reference carrier signal θ0 has a minimum value at time TM1 and has a maximum value at time TM2. For example, time TM1 and time TM2 are set as reference timings for the gate controllers 20 to synchronize carriers.

The main controller 10 generates a frame F11 and assigns "START" and command value data (for example, "DATA1" to "DATA3") for first to third data of the frame F11. At time TM1, the main controller 10 starts the transmission of the frame F11 to the gate controller 20U (S11). "START" includes information for enabling identification of the frame F11 and identification of a frame type of the frame F11. The information for enabling the identification of the frame type is, for example, information including a preamble (Pre.), start detection data (SFD), management information, and the like shown in FIG. 7. Data "DATA1" to "DATA3" are command values supplied to the gate controllers 20U to 20W and correspond to control commands CONT for controlling control targets within the gate controllers 20U to 20W. The above-described control targets may include, for example, a relay, a circuit breaker, and the like that are not shown.

The gate controller 20U receives the above-described frame F11 and extracts the data from "DATA1" to "DATA3" from the frame F11 by disassembling the frame F11. The gate controller 20U uses "DATA1" for control within the gate controller 20U. The gate controller 20U generates a frame F12 having the same configuration as the frame F11 and assigns the above-described "DATA2" and "DATA3" to first and second data of the frame F12 (C11). The gate controller 20U assigns "current FBK1" to the third data of the frame F12 and starts the transmission of the frame F12 to the gate controller 20V (S12). For example, "current FBK1" is an average value of a U-phase current detected in control cycle t0 immediately before control cycle t1.

The gate controller 20V receives the above-described frame F12 and extracts "DATA2," "DATA3," and "current FBK1" from the frame F12 by disassembling the frame F12. The gate controller 20V uses "DATA2" for control within the gate controller 20V. The gate controller 20V generates a frame F13 having the same configuration as the frame F11 and assigns the above-described "DATA3" and "current FBK1" to first and second data of the frame F13 (C12). The gate controller 20V assigns "current FBK2" to the third data of the frame F13 and starts the transmission of the frame F13 to the gate controller 20W (S13). For example, "current FBK2" is an average value of a V-phase current detected in control cycle t0 immediately before control cycle t1.

The gate controller 20W receives the above-described frame F13 and extracts "DATA3," "current FBK1," and "current FBK2" from the frame F13 by disassembling the frame F13. The gate controller 20W uses "DATA3" for control within the gate controller 20W. The gate controller 20W generates a frame F14 having the same configuration as the frame F11 and assigns "current FBK1" and "current FBK2" to first and second data of the frame F14 (C13). The gate controller 20W assigns "current FBK3" to third data of the frame F14 and starts the transmission of the frame F14 to the main controller 10 (S14). For example, "current FBK3" is an average value of a W-phase current detected in control cycle t0 immediately before control cycle t1.

The main controller 10 receives the above-described frame F14 and extracts values from "current FBK1" to "current FBK3" from the frame F14 by disassembling the frame F14. The main controller 10 calculates values from "reference voltage VREF1" to "reference voltage VREF3" by executing a reference voltage generation calculation process on the basis of the values from "current FBK1" to "current FBK3" (VREFG).

The main controller 10 generates a frame F21 having the same configuration as the above-described frame F11 and assigns the above-described values from "reference voltage VREF1" to "reference voltage VREF3" to first to third data of the frame F21 (C10).

For example, the values from "reference voltage VREF1" to "reference voltage VREF3" in the present embodiment are the above-described reference voltages Vu*, Vv*, and Vw*.

The gate controller 20W starts the transmission of the frame F21 to the gate controller 20W (S21).

The gate controller 20U receives the above-described frame F21 and extracts values from "reference voltage VREF1" to "reference voltage VREF3" from the frame F21 by disassembling the frame F21. The gate controller 20U uses "reference voltage VREF1" for controlling the single-phase power converter 3U. The gate controller 20U generates a frame F12 and assigns "reference voltage VREF2" and "reference voltage VREF3" described above to first and second data of the frame F12 (C21). The frame F22 does not include a field for assigning third data. The gate controller 20U starts the transmission of the frame F22 to the gate controller 20V (S22).

The gate controller 20V receives the above-described frame F22 and extracts "reference voltage VREF2" and "reference voltage VREF3" from the frame F22 by disassembling the frame F22. The gate controller 20V uses "reference voltage VREF2" for controlling the single-phase power converter 3V. The gate controller 20V generates a frame F13 and assigns "reference voltage VREF3" to first data of the frame F13 (C22). The frame F22 does not include a field for assigning second and third data. The gate controller 20V starts the transmission of the frame F23 to the gate controller 20W (S23).

The gate controller 20W receives the above-described frame F23 and extracts "reference voltage VREF3" from the frame F23 by disassembling the frame F23. The gate controller 20W uses "reference voltage VREF3" for controlling the single-phase power converter 3W. Also, because the gate controller 20W does not transmit a frame to the main controller 10 in accordance with this, no new frame is generated.

The gate controllers 20U to 20W detect that a timing corresponding to time TM2 has been reached on the basis of a phase of each PWM carrier and update a reference voltage of the next control cycle in accordance with the detection of the above-described timing on the basis of the values from "reference voltage VREF1" to "reference voltage VREF3."

Each gate controller 20U regulates a phase of its own node carrier on the basis of, for example, a corrected timing decided using a prescribed amount of offset for the above-described timing.

The delay time of serial communication and the transmission processing time within the node related to a data transmission process can be predetermined by design. For example, a magnitude of the above-described offset may be predetermined using relationships between a value of the delay time of the serial communication, a value of the processing time within the node related to the transmission process, and the number of stages of the cascade connection. The number of stages of the cascade connection may be defined by setting the main controller 10 as a starting point, setting the gate controller 20U as a first stage, setting the gate controller 20V as a second stage, and setting the gate controller 20W as a third stage. More specifically, the above-described offset time may be determined by the arithmetic expression shown in the following Expression (1). The following Expression (1) uses a representative value as the delay time of the serial communication.

(Delay time of serial communication)×(Number of stages)+(Processing time within node)×(Number of stages−1)  (1)

The gate controller 20U generates a PWM carrier (a first timing signal) regulated to synchronize with the reference timing signal 00. The gate controller 20U generates a desired first gate pulse for generating a U-phase voltage waveform to synchronize with the PWM carrier and supplies the generated first gate pulse to the single-phase power converter 3U. The gate controller 20V generates a PWM carrier (a second timing signal) regulated to synchronize with the reference timing signal θ0 using a signal received from the gate controller 20U. The gate controller 20V generates a desired second gate pulse for generating a voltage waveform of the V-phase to synchronize with the second timing signal and supplies the generated second gate pulse to the single-phase power converter 3V. The gate controller 20W is similar to the gate controller 20V. The U-phase voltage waveform, the V-phase voltage waveform, and the W-phase voltage waveform are phase voltage waveforms of a common type. For example, the above-described phase voltage waveform is a three-level phase voltage waveform or a five-level phase voltage waveform.

In the case of the cascade communication as described above, as the number of stages increases, the deviation caused by a transmission delay becomes significant, but can be compensated for in the above method.

According to the above-described embodiment, the gate controller 20U decides on either the three-level phase voltage waveform or the five-level phase voltage waveform on the basis of setting information for designating a type of phase voltage waveform and controls the first power converter so that the decided phase voltage waveform is output from the first power converter. The gate controller 20U controls the second power converter so that a phase voltage waveform having the same type as the phase voltage waveform of the first power converter is output from the second power converter on the basis of setting information for designating the type of phase voltage waveform. Thereby, the drive system 1 can share components related to the control device 6 that controls the converter 3 regardless of the number of quantization levels of the phase voltage waveform applied to the winding of the AC motor by the converter 3. Each of the first power converter and the second power converter is an example of the configuration of the converter 3.

In the drive system 1 described above, the gate controller 20U reproduces a PWM carrier (carrier information) to synchronize with the reference carrier signal 00 from a frame received from the main controller 10. The gate controller 20U generates a desired phase voltage waveform to mutually synchronize with a reference timing in association with the reference timing on the basis of the reproduced PWM carrier and the reference voltage for the received gate controller 20U. The gate controller 20V reproduces the PWM carrier from the frame received from the gate controller 20U. The gate controller 20V generates a desired phase voltage waveform to synchronize with the reference timing in association with the reference timing on the basis of the reproduced PWM carrier and the received reference voltage for the gate controller 20V. The case of the gate controller 20W is also similar to the cases of the gate controller 20U and the gate controller 20V described above.

The features of the drive system 1 of the embodiment are arranged in a viewpoint different from that of the above-described features of the drive system 1. The control device 6 of the drive system 1 includes a plurality of control modes that are alternately selected and a desired control mode is selected in a setting process. For example, the first mode is a mode in which the AC motor 2 is driven by a voltage of a three-level type (first level type) voltage waveform by controlling one NPC-type leg of the first power converter and one NPC-type leg of the second power converter. The second mode is a mode in which the AC motor 2 is driven by a voltage of a five-level type (second level type) voltage waveform by controlling a plurality of NPC-type legs of the first power converter and a plurality of NPC-type legs of the second power converter. Thereby, the drive system 1 can share a component related to the control device 6 for controlling the converter 3 regardless of the number of quantization levels of the phase voltage waveform applied to the winding of the AC motor 2 by the converter 3 as described above. As described above, the number of legs of the converter 3 may be the same or different between phases.

The main controller 10 of the embodiment supplies a reference voltage corresponding to a three-level phase voltage waveform to each of the gate controller 20U, the gate controller 20V, and the gate controller 20W. Thereby, each of the gate controller 20U, the gate controller 20V, and the gate controller 20W converts a reference voltage related to a three-level phase voltage waveform into a reference voltage related to a five-level phase voltage waveform on the basis of setting information for designating the type of phase voltage waveform.

Modified Examples of First Embodiment

Modified examples of the first embodiment will be described with reference to FIG. 11.

In the first embodiment, the case in which the number of pieces of data transmitted/received by the gate controller 20 is fixed has been described. In the present modified example, instead of this, a case in which the number of pieces of data is easily changed will be described. FIG. 11 is a diagram for describing a data structure within the frame of the modified example of the first embodiment.

There may be a request for regulating at least one of the number of pieces of data that is transmitted from the main controller 10 to the gate controller 20 or the number of pieces of data that is transmitted to the main controller 10 by the gate controller 20. In this case, the main controller 10 notifies each gate controller 20 of the number of pieces of data that is transmitted by the main controller 10 or the number of pieces of data that is returned to the main controller 10 at the start of serial communication, such that the above-described regulation is enabled. For example, each gate controller 20 having received the notification from the main controller 10 may identify the number of pieces of transmission data and the number of pieces of reception data after each gate controller 20 starts a frame reception process, and extract a desired number of pieces of data.

Figure 11:
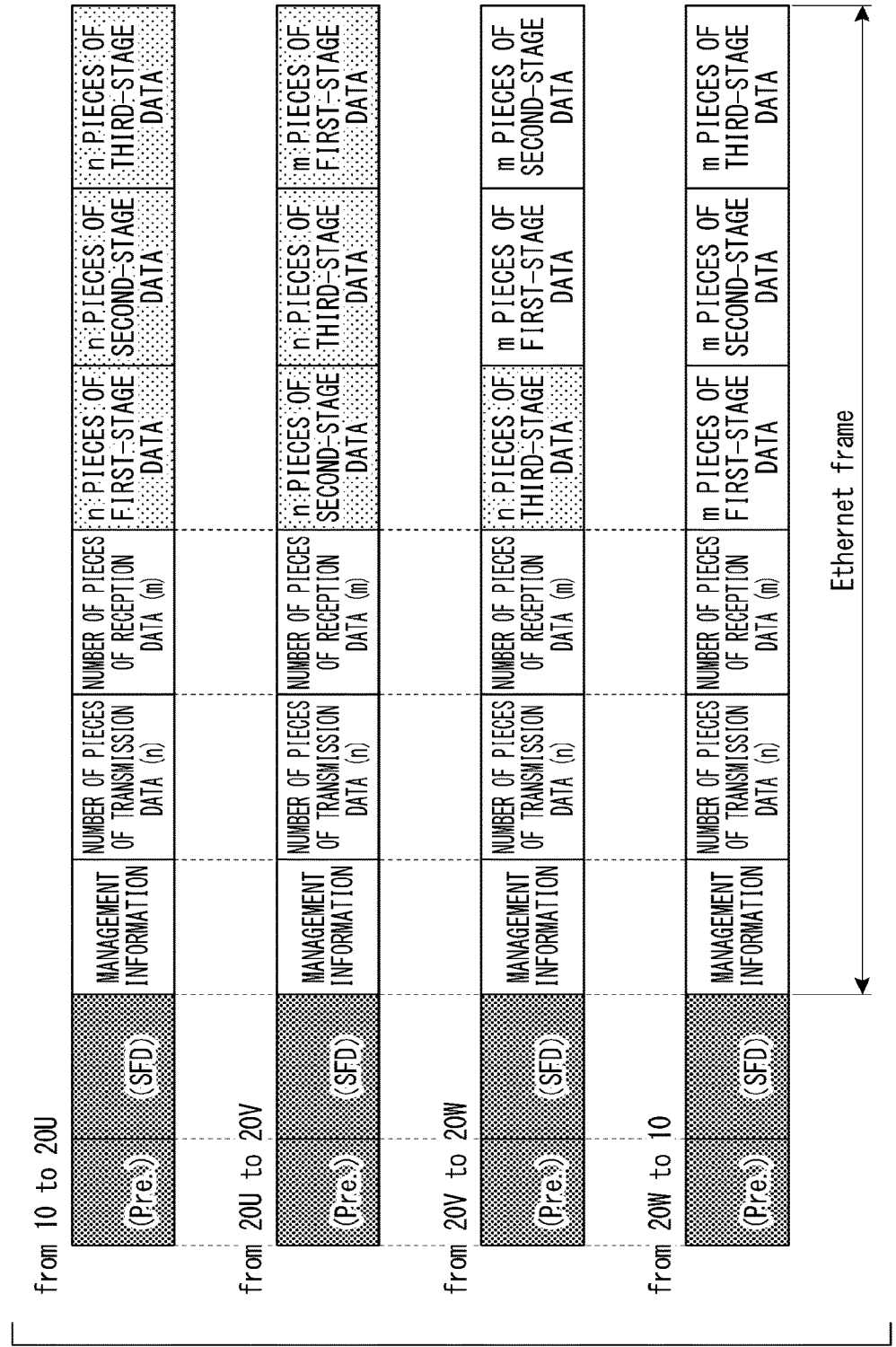
FIG. 11 is a diagram for describing a data structure within a frame of a modified example of the first embodiment.

As shown in FIG. 11, two pieces of information including the "number of pieces of transmission data" and the "number of pieces of reception data" are added after management information in the frame. The "number of pieces of transmission data" is identification information indicating a size, a quantity, or the like of transmission data that is transmitted by the main controller 10 to the gate controller 20. For example, an integer n indicating the number of pieces of transmission data is set for the "number of pieces of transmission data." The "number of pieces of reception data" is identification information indicating a size, a quantity, or the like of reception data that is received by the main controller 10 from the gate controller 20. For example, an integer m indicating the number of pieces of reception data is set in the "number of pieces of reception data."

Subsequently, data for the number of stages of each gate controller 20 is allocated. For example, when the main controller 10 transmits transmission data to each of the gate controllers 20 of the three stages, a set of n pieces of data is assigned to three frames. Also, when the gate controller 20U transmits two sets of transmission data including n pieces of data and one set of reception data including m pieces of data to the gate controller 20V, the number of pieces of transmission data and the number of pieces of reception data described above are assigned to each frame.

Thus, by configuring the frame so that the number of pieces of data to be assigned to the frame can be set using a variable, the number of pieces of data to be transmitted and received (the number of pieces of data) can be controlled and changed from the main controller 10 side.

Second Embodiment

Figure 12A:
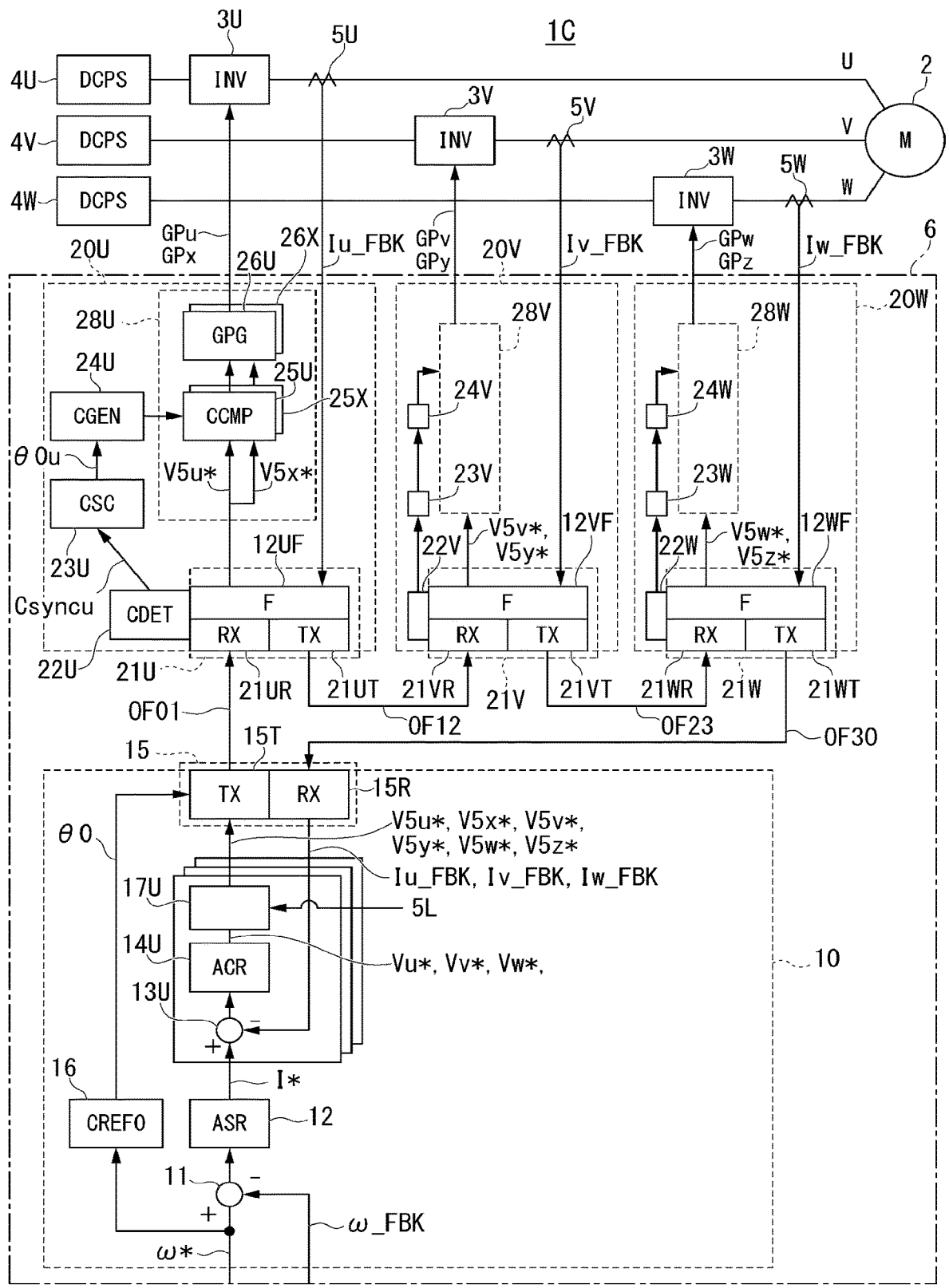
FIG. 12A is a configuration diagram of a drive system of a second embodiment.
Figure 12B:
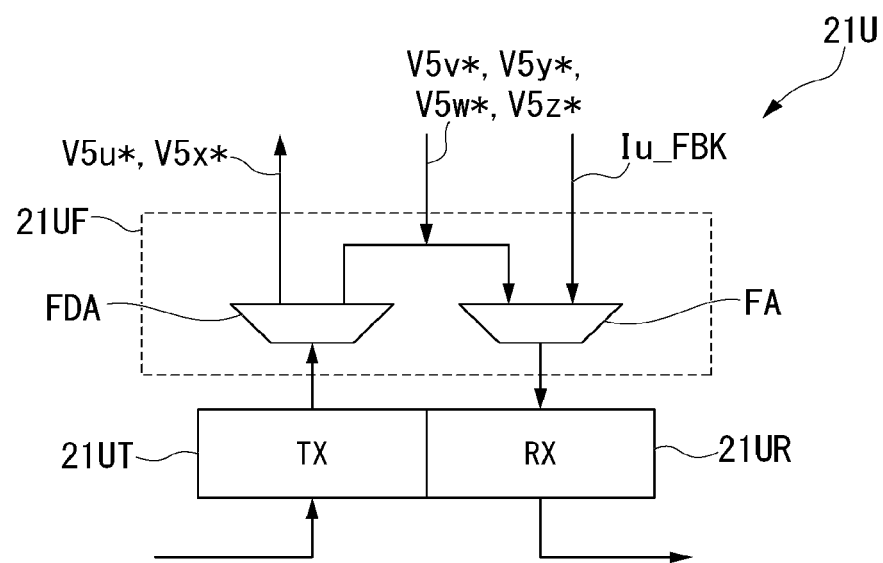
FIG. 12B is a configuration diagram of a serial transceiver of the second embodiment.

A drive system 1C of a second embodiment will be described. FIG. 12A is a configuration diagram of the drive system 1C of the second embodiment. FIG. 12B is a configuration diagram of a serial transceiver of the second embodiment.

In the first embodiment, the case in which the reference voltage converters 27U, 27V, and 27W for performing conversion from a reference voltage for three levels into a reference voltage for five levels are provided in each gate controller 20 has been described. Instead of this, in the present embodiment, a case in which a reference voltage converter having a conversion function equivalent to the reference voltage converter is provided in a main controller 10A will be described.

The drive system 1C includes the main controller 10A and a gate controller 20A. As described above, the main controller 10A includes reference voltage converters 17U, 17V, and 17W with respect to the main controller 10. The gate controller 20A does not have reference voltage converters 27U, 27V, and 27W with respect to a gate controller 20. A difference between the set of the main controller 10A and the gate controller 20A and the set of the main controller 10 and the gate controller 20 is that positions where the reference voltage converters are provided are different from each other.

In the reference voltage converters 17U, 17V, and 17W, one type of reference voltage between a reference voltage related to the three-level phase voltage waveform and a reference voltage related to the five-level phase voltage waveform is alternately selected. The main controller 10A supplies the selected type of reference voltage to the gate controller 20UA, the gate controller 20VA, and the gate controller 20WA. Accordingly, because an amount of data that is transmitted from the main controller 10A to each gate controller 20A increases, it is only necessary to review the assignment of data within the frame as follows so that the data is accommodated in the frame.

For example, in relation to the above-described values from "reference voltage VREF1" to "reference voltage VREF3" in FIG. 10, in the present embodiment, it is only necessary to assign the above-described reference voltages V5$u$* and V5$x$* to "reference voltage VREF1," assign the above-described reference voltages V5$v$* and V5$y$* to "reference voltage VREF2," and assign the above-described reference voltages V5$w$* and V5$z$* to "reference voltage VREF3."

As described above, the main controller 10A converts a reference voltage related to a three-level phase voltage waveform into a reference voltage related to the five-level phase voltage waveform on the basis of setting information for designating the type of the phase voltage waveform and supplies the reference voltage related to the five-level phase voltage waveform to each of the gate controller 20U and the gate controller 20V. Thereby, because the main controller 10A can alternately generate both the reference voltage for the three-level phase voltage waveform and the reference voltage for the five-level phase voltage waveform, effects similar to those of the first embodiment can be obtained.

According to at least one embodiment described above, the drive system 1 of the embodiment drives a multi-phase AC motor having a plurality of windings. The drive system 1 includes a first power converter, a second power converter, a first conversion controller, and a second conversion controller. The first power converter causes a current to flow through a winding of a first phase of the multi-phase AC motor. The second power converter causes a current to flow through a winding of a second phase of the multi-phase AC motor. The first conversion controller decides on either a three-level phase voltage waveform or a five-level phase voltage waveform on the basis of setting information for designating a type of phase voltage waveform and controls the first power converter so that the decided phase voltage waveform is output from the first power converter. The second conversion controller controls the second power converter so that a phase voltage waveform having the same type as the phase voltage waveform of the first power converter is output from the second power converter on the basis of the setting information for designating the type of phase voltage waveform. Thereby, it is possible to share a component related to the control device 6 for controlling the converter 3 regardless of the number of quantization levels of the voltage waveform applied to the winding of the AC motor 2 by the converter 3.

While several embodiments of the present invention have been described above, these embodiments have been presented by way of example only, and are not intended to limit the scope of the inventions. These embodiments may be embodied in a variety of other forms. Various omissions, substitutions, and combinations may be made without departing from the spirit of the inventions. The inventions described in the accompanying claims and their equivalents are intended to cover such embodiments or modifications as would fall within the scope and spirit of the inventions.

REFERENCE SIGNS LIST 1, 1A, 1B, 1C Drive system
2 AC motor
3 Converter
3A Three-level type power converter
3B NPC type power converter
3U, 3V, 3W Single-phase power converter
4 DC power supply
6 Control device
10, 10A Main controller
20, 20A Gate controller
15, 21U, 21V, 21W Serial transceiver 17U, 17V, 17W, 27U, 27V, 27W Reference voltage converter 30, 31, 31, 33 Leg

The invention claimed is:

1. A drive system for driving a multi-phase alternating current (AC) motor having a plurality of windings, the drive system comprising: a first power converter configured to cause a current to flow through a winding of a first phase of the multi-phase AC motor; a second power converter configured to cause a current to flow through a winding of a second phase of the multi-phase AC motor; a first conversion controller configured to decide on either a three-level phase voltage waveform or a five-level phase voltage waveform on a basis of setting information for designating a type of phase voltage waveform and control the first power converter so that the decided phase voltage waveform is output from the first power converter; and a second conversion controller configured to control the second power converter so that a phase voltage waveform having the same type as the phase voltage waveform of the first power converter is output from the second power converter on the basis of the setting information for designating the type of phase voltage waveform.

2. The drive system according to claim 1,
wherein the first conversion controller generates a first timing signal regulated to synchronize with a reference timing, generates a desired first gate pulse for generating a first phase voltage waveform of either the three-level phase voltage waveform or the five-level phase voltage waveform to synchronize with the first timing signal, and supplies the generated first gate pulse to the first power converter, and
wherein the second conversion controller generates a second timing signal regulated to synchronize with the reference timing using a signal received from the first conversion controller, generates a desired second gate pulse for generating a second phase voltage waveform having the same type as the first phase voltage waveform to synchronize with the second timing signal, and supplies the generated second gate pulse to the second power converter.

3. The drive system according to claim 2, comprising a main controller configured to generate a signal related to the reference timing, a reference voltage for the first conversion controller, and a reference voltage for the second conversion controller,
wherein the first conversion controller receives the signal from the main controller, reproduces the signal related to the reference timing, acquires the reference voltage for the first conversion controller and the reference voltage for the second conversion controller, and further transmits the reference voltage for the second conversion controller to the second conversion controller.

4. The drive system according to claim 3, wherein, when a communication path using a prescribed multiplexing structure for multiplexing data in communication between the main controller and the first conversion controller and communication between the first conversion controller and the second conversion controller is used,
the main controller includes at least the reference voltage for the first conversion controller and the reference voltage for the second conversion controller within one unit multiplexing structure (unit frame) and transmits the one unit multiplexing structure (unit frame), and
the first conversion controller includes at least the reference voltage for the second conversion controller within one unit multiplexing structure (unit frame) and transmits the one unit multiplexing structure (unit frame).

5. The drive system according to claim 3, wherein the first conversion controller reproduces the signal related to the reference timing received from the main controller and generates a desired phase voltage waveform to synchronize with the reference timing on a basis of a received reference voltage for the first conversion controller using the reproduced signal, and wherein the second conversion controller reproduces the signal related to the reference timing received from the first conversion controller and generates a desired phase voltage waveform to synchronize with the reference timing on the basis of the received reference voltage for the second conversion controller using the reproduced signal.

6. The drive system according to claim 3, wherein the first conversion controller reproduces the signal related to the reference timing received from the main controller, regulates a phase of the reproduced signal using a phase difference of a prescribed value, and generates the desired phase voltage waveform to synchronize with the reference timing in association with the reference timing on a basis of a received reference voltage for the first conversion controller using the regulated phase.

7. The drive system according to claim 1, wherein the first conversion controller controls the first power converter on a basis of first selection information for designating either the three-level phase voltage waveform or the five-level phase voltage waveform, and wherein the second conversion controller controls the second power converter on a basis of second selection information for designating a phase voltage waveform having the same type as the phase voltage waveform designated in the first selection information.

8. The drive system according to claim 1, comprising a main controller configured to supply a selected type of reference voltage to the first conversion controller and the second conversion controller when a type of reference voltage is alternately selected between the reference voltage related to the three-level phase voltage waveform and the reference voltage related to the five-level phase voltage waveform.

9. The drive system according to claim 1,
wherein each of the first power converter and the second power converter includes one or more legs and generates either the three-level phase voltage waveform or the five-level phase voltage waveform using the one or more legs included therein,
wherein the first power converter outputs a first phase voltage waveform that has been generated to a first terminal connected to the winding of the first phase, and
wherein the second power converter outputs a second phase voltage waveform that has been generated to a second terminal connected to the winding of the second phase.

10. A control device for controlling a drive system including a first power converter configured to cause a current to flow through a winding of a first phase of a multi-phase AC motor and a second power converter configured to cause a current to flow through a winding of a second phase of the multi-phase AC motor, the control device comprising:
a first conversion controller configured to control the first power converter so that either a three-level phase voltage waveform or a five-level phase voltage waveform is output from the first power converter in accordance with a type of the first power converter; and a second conversion controller configured to control the second power converter so that a phase voltage waveform having the same type as the phase voltage waveform of the first power converter is output from the second power converter in relation to the second power converter whose type is classified as a type that is the same as that of the first power converter.

11. The control device for the drive system according to claim 10, comprising a main controller configured to supply a reference voltage related to the three-level phase voltage waveform to the first conversion controller and the second conversion controller, wherein the first conversion controller and the second conversion controller convert the reference voltage related to the three-level phase voltage waveform into a reference voltage related to the five-level phase voltage waveform on a basis of setting information for designating a type of phase voltage waveform.

12. The control device for the drive system according to claim 10, comprising a main controller configured to convert a reference voltage related to the three-level phase voltage waveform into a reference voltage related to the five-level phase voltage waveform on a basis of setting information for designating a type of phase voltage waveform and supply the reference voltage related to the five-level phase voltage waveform to the first conversion controller and the second conversion controller.

13. A drive system for driving a multi-phase AC motor having a plurality of windings, the drive system comprising: a first power converter including one or more neutral-point-clamped (NPC) type legs and configured to cause a current to flow through a winding of a first phase of the multi-phase AC motor; a second power converter including a plurality of NPC-type legs greater than or equal in number to the NPC-type legs in the first power converter and configured to cause a current to flow through a winding of a second phase of the multi-phase AC motor; and a controller including a control mode for alternately selecting a first mode in which the multi-phase AC motor is driven at a first level type voltage by controlling one NPC-type leg of the first power converter and one NPC-type leg of the second power converter and a second mode in which the multi-phase AC motor is driven at a second level type voltage by controlling a plurality of NPC-type legs of the first power converter and the plurality of NPC-type legs of the second power converter and configured to select the control mode in a setting process.

* * * * *